(12) United States Patent
Aldera et al.

(10) Patent No.: US 8,413,209 B2
(45) Date of Patent: Apr. 2, 2013

(54) SYSTEM FOR ENFORCING SECURITY POLICIES ON MOBILE COMMUNICATIONS DEVICES

(75) Inventors: Carlo Aldera, Turin (IT); Paolo De Lutiis, Turin (IT); Maria Teresa Grillo, Turin (IT); Manuel Leone, Turin (IT); Alessandro Basso, Turin (IT); Michele Miraglia, Turin (IT)

(73) Assignee: Telecom Italia S.p.A., Milan (IT)

( * ) Notice: Subject to any disclaimer, the term of this patent is extended or adjusted under 35 U.S.C. 154(b) by 1130 days.

(21) Appl. No.: 12/225,685

(22) PCT Filed: Mar. 27, 2006

(86) PCT No.: PCT/EP2006/002788
§ 371 (c)(1),
(2), (4) Date: Oct. 29, 2008

(87) PCT Pub. No.: WO2007/110094
PCT Pub. Date: Oct. 4, 2007

(65) Prior Publication Data
US 2010/0064341 A1    Mar. 11, 2010

(51) Int. Cl.
    *G06F 17/00* (2006.01)
(52) U.S. Cl. .................................. 726/1; 713/185
(58) Field of Classification Search .............. 726/1, 22, 726/23, 9, 20, 21; 713/151, 185
See application file for complete search history.

(56) References Cited

U.S. PATENT DOCUMENTS

| 7,171,555 B1 * | 1/2007 | Salowey et al. ............... 713/156 |
| 7,350,077 B2 * | 3/2008 | Meier et al. ................... 713/171 |
| 7,797,726 B2 * | 9/2010 | Ashley et al. ..................... 726/1 |
| 2003/0028763 A1 * | 2/2003 | Malinen et al. ............... 713/155 |
| 2003/0190908 A1 * | 10/2003 | Craven .......................... 455/411 |
| 2005/0055578 A1 * | 3/2005 | Wright et al. ................. 713/201 |
| 2006/0288407 A1 * | 12/2006 | Naslund et al. ................... 726/9 |
| 2007/0044151 A1 * | 2/2007 | Whitmore ...................... 726/23 |
| 2007/0199044 A1 * | 8/2007 | Hughes ............................. 726/1 |
| 2008/0194296 A1 * | 8/2008 | Roundtree .................... 455/558 |
| 2008/0244685 A1 * | 10/2008 | Andersson et al. ............... 726/1 |
| 2009/0177882 A1 * | 7/2009 | Saran et al. ................... 713/159 |

FOREIGN PATENT DOCUMENTS

| WO | WO 2004/032557 A1 | 4/2004 |
| WO | WO 2005/064498 A1 | 7/2005 |

\* cited by examiner

*Primary Examiner* — Eleni Shiferaw
*Assistant Examiner* — Abu Sholeman
(74) *Attorney, Agent, or Firm* — Finnegan, Henderson, Farabow, Garrett & Dunner, L.L.P.

(57) ABSTRACT

A system for enforcing security policies on mobile communications devices is adapted to be used in a mobile communications network in operative association with a subscriber identity module. The system having a client-server architecture includes a server operated by a mobile communications network operator and a client resident on a mobile communications device on which security policies are to be enforced. The server is adapted to determine security policies to be applied on said mobile communications device, and to send thereto a security policy to be applied. The client is adapted to receive the security policy to be applied from the server, and to apply the received security policy. The server includes a server authentication function adapted to authenticate the security policy to be sent to the mobile communications device; the client is further adapted to assess authenticity of the security policy received from the server by exploiting a client authentication function resident on the subscriber identity module.

24 Claims, 7 Drawing Sheets

SYSTEM FOR ENFORCING SECURITY POLICIES ON MOBILE COMMUNICATIONS DEVICES

CROSS REFERENCE TO RELATED APPLICATION

This application is a national phase application based on PCT/EP2006/002788, filed Mar. 27, 2006.

BACKGROUND OF THE INVENTION

1. Field of the Invention

The present invention generally relates to the field of mobile communications. More particularly, the invention relates generally to systems and methods for enforcing security policies on mobile communications devices adapted to the use in mobile communications networks.

2. Description of the Related Art

Mobile communications terminals have increased in the years their data processing capabilities, in order to be able to support more and richer services in addition to enabling plain Inter-personal communications; from another hand, previous portable data processing devices like Personal Digital Assistants (PDAs) have been enhanced with wireless communications capabilities. As a consequence, many mobile communications terminals can nowadays be regarded as real data processing systems, like Personal Computers (PCs), and the trend is towards further increase of the processing power.

As an undesirable side effect, wireless communications devices, like any other data processing apparatus, have become targets for attacks perpetrated by computer viruses, trojan horses, worms and malware (acronym for "malicious software") in general.

Malware may cause frauds, destruction or loss of data, unauthorized accesses, unavailability of services, violation of privacy, which translates in significant economic losses, both for the user of the mobile terminal and for the mobile communications network operator.

In order to reduce the risk of exposition to attacks of the mobile communications devices, methods and systems for enforcing specific security policies have been developed.

A security policy enforcement system is responsible of implementing and ensuring the enforcement of desired security policies on the mobile communications devices. The security policies are typically created by a security administrator, and include rules defining admissible behaviors useful for minimizing the possibility of threats to the security of the generic mobile device and of the data stored therein, as well as of the mobile network operator, and/or of an enterprise corporation employing or visited by users of the mobile devices.

Security policies may be defined by different actors according to the specific considered scenario. For instance, security policies may be defined by the end user of the mobile communications device in a consumer scenario, by a security administrator in respect of mobile communications devices of the employees in an enterprise/corporation scenario, by the mobile communications network operator, or by the manufacturer of the mobile communications device, and so on.

Typically, in an enterprise/corporation scenario, the security policies are implemented and administered in a centralized way, in order to set up a uniform and homogeneous security domain. US 2005/0055578 discloses a client/server architecture for managing and enforcing the security policies and for monitoring the status of mobile devices. In that document, the protection of data on a client mobile computing device by a server computer system such as within an enterprise network or on a separate mobile computing device is described. Security tools are described that provide different security policies to be enforced based on a location associated with a network environment in which a mobile device is operating. Methods for detecting the location of the mobile device are described. The security tools may also provide for enforcing different policies based on security features. Examples of security features include the type of connection, wired or wireless, over which data is being transferred, the operation of anti-virus software, or the type of network adapter card. The different security policies provide enforcement mechanisms that may be tailored based upon the detected location and/or active security features associated with the mobile device. Examples of enforcement mechanisms provided are adaptive port blocking, file hiding and file encryption.

WO 2005/064498 discloses a system and method for enforcing a security policy on mobile devices using dynamically generated security profiles. The system and method for enforcing security parameters collects information from a source relating to a mobile device. Based on the collected information, an identity status for the mobile device is determined that uniquely identifies the mobile device and distinguishes it from other mobile devices. The identity status of the mobile device can be determined when the mobile device connects to a computing node source or when the mobile device accesses a resource within the network. A security profile based on the identity status of the mobile device is generated and the security profile is applied to the mobile device.

SUMMARY OF THE INVENTION

The Applicant has observed that the solutions known in the art for implementing and enforcing security policies on mobile communications devices are not very satisfactory. Such solutions are indeed essentially based on software. Due to this, they are prone to attacks: for example, the security policies that are to be enforced on the mobile communications devices might be manipulated by an attacker, e.g. a virus, and modified so as to produce different actions on the mobile communications device than what would be expected by the security administrator; this may jeopardize the security of the communications, the user and the application data, the authentication credentials, etc.

The Applicant has tackled the problem of improving the degree of security ensured by security policies enforcement platforms for mobile communications devices.

The Applicant has found that a much higher security level can be achieved by providing a mechanism adapted to guarantee the authenticity and integrity of the security policies to be enforced. In particular, the Applicant has found that it would be expedient to exploit, for guaranteeing the authenticity and integrity of the security policies to be enforced, a hardware token, and particularly the mobile communications device user's SIM (Subscriber Identify Module) and the functions made available by it; as known in the art, and for the purposes of the present invention, the SIM is realized in the form of an IC (Integrated Circuit) smart-card, and is the module that needs to be associated with any mobile communications device for enabling access to, and exploitation of services of a mobile communications network like a GSM (Global System for Mobile communications) network, or a UMTS (Universal Mobile Telecommunications System) network (and networks complying to counterpart standards). For the purposes of the presence invention, the term SIM should be construed to encompass any module, e.g. in the form of a card, that has to be operatively associated with the mobile communications device (being for example removable), and that is adapted to allow identifying and/or authenticating the user of the mobile communications device in the mobile communications network; in particular, the term SIM also encompass a USIM (UMTS SIM).

The SIM is typically equipped with at least one data processor (e.g., a microprocessor), comprising at least one data processing logic (a Central Processing Unit—CPU) and at least one memory, and an interface adapted to allow loading in the memory of programs to be executed by the data processor.

The SIM has proven to be a very secure way to ensure authenticity. The SIM implements native security mechanisms, like protected storage areas, anti-tampering shields and sensors, cryptographic functions, etc. The SIM may also implement, in addition to functions strictly related to the operation in the mobile communications network, relatively simple applications, proprietary of the mobile network operator, that are intended to make value-added services available to the subscribers. In particular, the ETSI (European Telecommunications Standard Institutes), in the document GSM 11.14 has set forth a standard, known as SAT (SIM Application Toolkit) defining how relatively simple applications may be implemented on the SIM. These applications resident on the SIM may further be managed, e.g. updated by the network operator remotely, in OTA (Over The Air) mode.

According to the Applicant, all this makes the SIM very useful for implementing a highly secure security policy enforcement platform, and particularly for guaranteeing authenticity and integrity of the security policies to be enforced.

Indeed, specialized attacks against the SIM are generally relatively expensive, due to the equipments and the skills required to perpetrate them.

Using the SIM for purposes related to the implementation and enforcement of the security policies on the mobile communications devices also enables the mobile communications network operator to play an active role in the security policies enforcement framework. In particular, the mobile communications network operator may develop a security policy enforcement platform, wherein the network operator plays the role of security provider, adapted for example to also protect the mobile communications network and the offered services. This is considered highly desirable, because several attacks against the mobile communications network (like for example Denial of Service—DoS- and Distributed DoS—DDoS-attacks, carried out exploiting malware installed on the mobile devices) may be perpetrated through the mobile communications terminals of the users.

Thus, according to an aspect of the present invention, a system is provided for enforcing security policies on mobile communications devices adapted to be used in a mobile communications network in operative association with a subscriber identity module.

The system has a client-server architecture and comprises a server operated by a mobile communications network operator, and a client resident on a mobile communications device on which security policies are to be enforced.

The server is adapted to determine security policies to be applied on said mobile communications device, and to send thereto a security policy to be applied, and the client is adapted to receive the security policy to be applied from the server, and to apply the received security policy.

The server includes a server authentication function adapted to authenticate the security policy to be sent to the mobile communications device, and the client is further adapted to asses authenticity of the security policy received from the server by exploiting a client authentication function resident on the subscriber identity module.

The system according to the present invention sets up a security policy enforcement platform that is adapted to ensure application of the desired security policies by the mobile devices exploiting SIM-based mechanisms for certifying the authenticity and integrity of the security policies to be applied, mechanisms that are inherently more secure than purely software-based mechanisms.

In a preferred embodiment, the policy enforcement platform is adapted to allow dynamically modifying the security policies on the mobile devices, using OTA mechanisms. In particular, the security policies may be modified asynchronously, responsive to the state of the mobile communications network, in order to adapt the level of security implemented on a generic mobile communications device to the security state of the network.

In addition, the modification of the security policies applied by the mobile communications devices may be triggered by signaling generated locally to the mobile communications device, e.g. by other security-related applications running on the mobile device, like for example anti-malware (anti-virus) applications, personal firewalls and the like.

In this way, the security policy enforcement platform allows an operator of a mobile communications network to modify the security policies applied on the mobile communications devices also in order to protect the mobile communications network, and the services offered by the network operator, against possible attacks.

By exploiting signaling coming from the network core or other platforms of or connected to the mobile network for dynamically activating specific security policies on the mobile devices, an adaptive security policy enforcement platform may be set up, capable for example of early blocking the diffusion of malware.

According to a second aspect of the present invention, a method is provided for enforcing security policies on mobile communications devices adapted to be used in a mobile communications network in operative association with a subscriber identity module. The method comprises:

having the mobile communications network determine a security policy to be applied on a mobile communications device, and send the security policy to the mobile communications device, having the mobile communications device receive the security policy and enforce it.

Said sending the security policy includes authenticating the security policy to be sent to the mobile communications device, and said having the mobile communications device receive the security policy and enforce it comprises having the mobile communications device asses the authenticity of the received security policy exploiting an authentication function resident on the subscriber identity module.

According to a third aspect of the present invention, a mobile communications device is provided and is adapted to be used in a mobile communications network in operative association with a subscriber identity module. The mobile communications device is adapted to receive from the mobile communications network a security policy to be enforced, and to apply the received security policy. The mobile communications device is further adapted to assess authenticity of the security policy received from the mobile communications network by exploiting an authentication function resident on the subscriber identity module operatively associated therewith.

According to a fourth aspect of the present invention, a subscriber identify module is provided and is adapted to be operatively associated with a mobile communications device for enabling use thereof in a mobile communications network. The subscriber identify module is adapted to implement an authentication function adapted to assess authenticity of a security policy received by the mobile communications device.

BRIEF DESCRIPTION OF THE DRAWINGS

The features and advantages of the present invention will be made apparent by the following detailed description of an embodiment thereof, provided merely by way of non-limitative example, description that will be made making reference to the annexed drawings, wherein.

DETAILED DESCRIPTION OF THE PREFERRED EMBODIMENT

Figure 1:
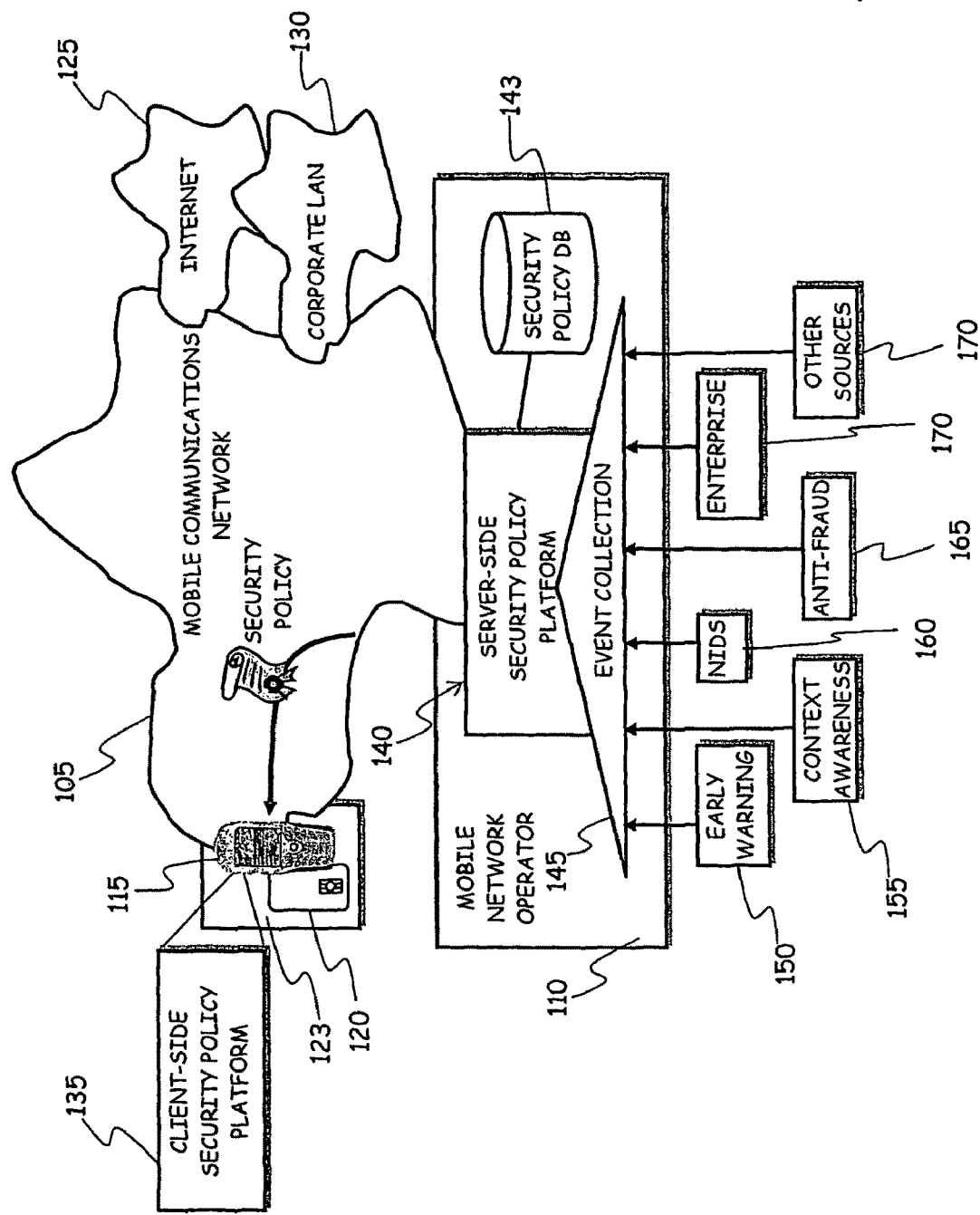
FIG. 1 schematically shows a scenario of mobile communications network wherein a security policy enforcement platform according to an embodiment of the present invention is applied.

Making reference to the drawings, FIG. 1 depicts a scenario of mobile communications network wherein a security policy enforcement platform according to an embodiment of the present invention is applied.

A mobile communications network, denoted 105, is or includes for example a GSM network, a GPRS (General Packet Radio System) network, an EDGE (Enhanced Data rate for GSM Evolution) network, a UMTS network, networks compliant to counterpart standards or mobile network based on proprietary technology. The detailed structure of the mobile communications network 105 is not shown nor will be described, being known to those skilled in the art, and being not relevant to the understanding of the invention embodiment being described.

The mobile communications network 105 is operated by a mobile network operator 110.

The mobile communications network 105 can be accessed by users of mobile communications devices, e.g. mobile phones, PDAs with mobile communications capabilities, smart phones, a portable computer with a GSM/GPRS/EDGE/UMTS adapter, or equivalent devices. In the drawing, a generic mobile communications device 115 is shown.

In order to access and get registered to the mobile communications network 105, the user of a mobile communications device needs to preliminary subscribe with the mobile network operator 110, or with another mobile network operator having a roaming agreement with the mobile network operator 110. Upon subscription, the mobile network operator 110 provides to the subscriber user a SIM 120, which as known is an IC smart-card designed to be operatively associated with the mobile communications device 115 for enabling it to work and to register (get identified and/or authenticated) to the mobile communications network 105. The association of the mobile communications device 115 with the SIM 120 makes the mobile communications device 115 operative in the mobile communications network 105, and is denoted 123 in the drawing.

In the case the mobile communications network 105 has a packet-switched infrastructure, like GPRS, supporting communications in data packets, the mobile communications network 105 may interface with public packet data networks like the Internet (schematically depicted in FIG. 1 and denoted therein 125), and/or one or more private packet data networks, for example private LANs of one or more enterprises, like the LAN 130 shown in the drawing.

The mobile communications device 115 may be equipped with one or more among a camera, a Bluetooth interface, a Wi-Fi interface, an IrDA (Infrared Data Association) interface; it may have installed several applications, including for example a client for a Virtual Private Network, a personal firewall, a data encrypting application.

Figure 2:
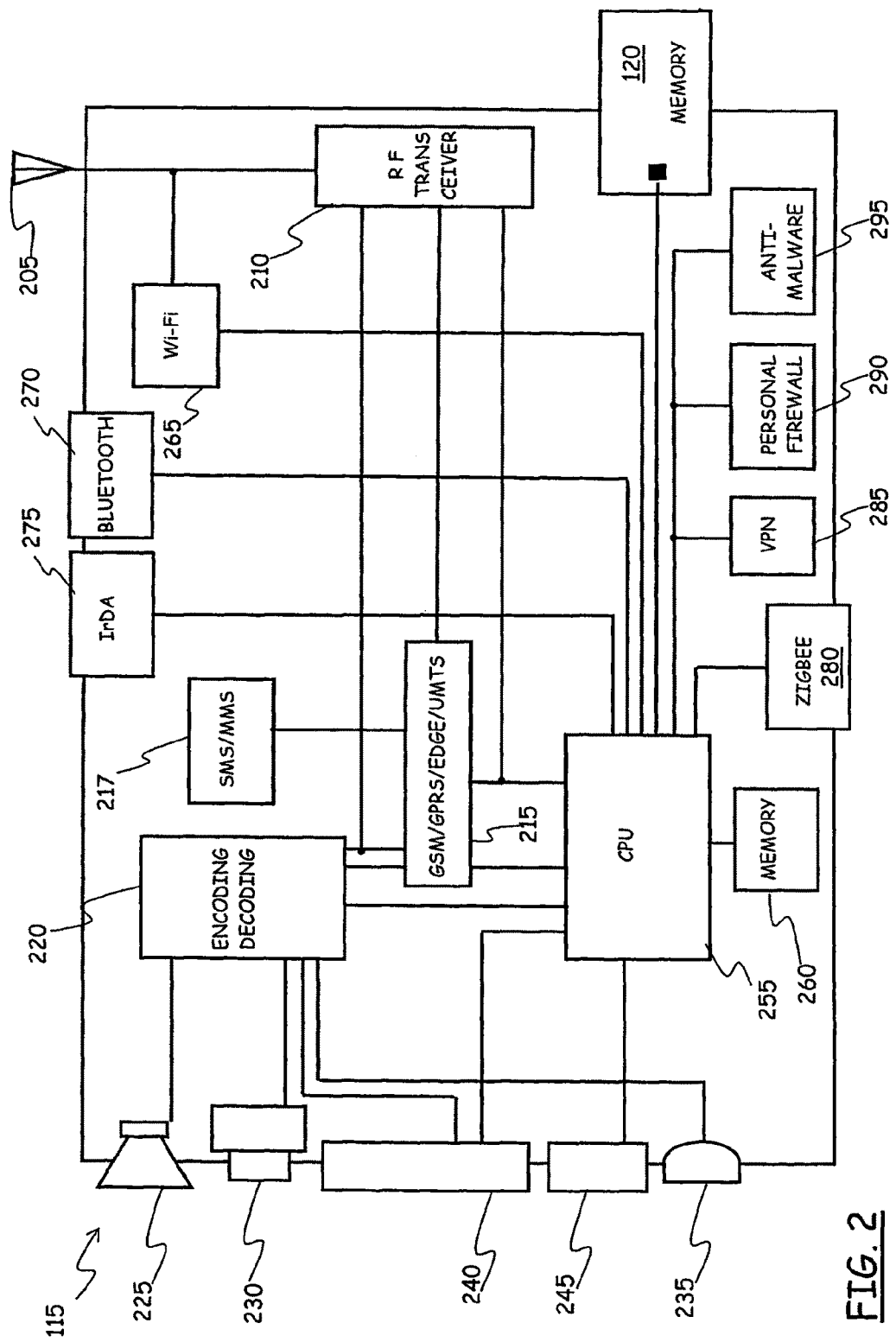
FIG. 2 shows schematically, in terms of functional blocks, a mobile communications device adapted to be used in the mobile communications network of FIG. 1.

Referring to FIG. 2, a schematic diagram of the main functional blocks of the exemplary mobile communications device 115 is shown. The mobile communications device 115 considered herein by way of example comprises an antenna 205 adapted to the transmission/reception, a radio-frequency transceiver 210, a GSM/GPRS/EDGE/UMTS module 215, an SMS/MMS module 117, an encoding/decoding unit 220, a loudspeaker 225, a video camera 230, a microphone 235, a screen 240, a keyboard 245, a processor (or CPU, Central Processing Unit) 255 with a memory 260 (RAM, ROM and Flash EEPROM) associated therewith. The association of the mobile communications device 115 with the SIM 120 is accomplished through suitable electrical contacts.

The antenna 205 and the radio-frequency transceiver 210 conventionally allow the communication from and towards radio base stations of the mobile communications network 105. The loudspeaker 225 and the microphone 235 conventionally transform an electrical signal corresponding to the voice in a signal audible by the user of the mobile communications device 115, and vice versa. The keyboard 245 conventionally allows the user to manually interact with the mobile communications device, to dial telephone number and send commands related, for instance, to choosing a menu option, or to the selection of a telephone number in the address book, etc. The screen 240 can be, for instance, an LCD (Liquid Crystal Display), and it may be adapted to show videoclips. The video camera 230, for instance a CCD (Charge-Coupled Device) camera, is conventionally adapted to capture a video or a still image. The GSM/GPRS/EDGE/UMTS module 215 conventionally includes devices adapted to support communications according to the GSM/GPRS/EDGE/UMTS standards; for example, for the purposes of GPRS communications, the module 215 includes a packetizing/depacketizing device and a buffer, and it is capable of encapsulating in packets the radio blocks coming from the mobile network, or to unpack in radio blocks the packets provided by the upper protocol layers, for the transmission toward the mobile communications network, through the radio-frequency transceiver 210 and the antenna 205. The encoding/decoding unit 220 (for instance an H.263 video codec) is connected to the loudspeaker 225, to the microphone 235, to the screen 240 and to the video camera 230: it conventionally manages the coding/decoding of the video captured by the video camera or to be displayed on the screen, and/or the audio component captured by the microphone or to be transmitted to the loudspeaker. The SMS/MMS module 117 manages the receipt/transmission of SMS/MMS messages. The processor 255 supervisions the operation and the activities of the different modules included in the mobile communications device 115. The memory 260, in combination with the processor 255, includes at least one software application for managing the communication with the mobile communications network and/or with other users of the communications network.

The mobile communications device 115 may further include one or more among a Wi-Fi communications module 265, for managing communications in a Wi-Fi network, a Bluetooth module 270, for managing communications according to the Bluetooth standard, an IrDA module 275, for managing IrDA communications, a ZigBee module 280, for managing ZigBee communications, and other communications modules, adapted to manage communications according to different standards, particularly albeit not limitatively short-range communications.

It is observed that despite in FIG. 2 different units are represented by separate entities with respect to the memory 260, at least some of the shown units can be realized at least in part by means of software programs stored in the memory 260 and performing the same function when executed by the processor 255. For example, the encoding/decoding unit and/or the GPRS module are shown as separate entities, but can also be realized at least partly by means of software program resident in the memory and executed by the processor of the mobile communications device. In particular, units than can be realized fully in software, but that are depicted as distinct entities, may include a VPN (Virtual Private Network) client module 285, a personal firewall module 290, an anti-malware module 295 (like an anti-virus application installed on the mobile communications device 115). The operation of the mobile communications device is governed by an operating system, not depicted in the drawing.

As known in the art, the SIM 120 includes in turn at least one data processor, e.g. a microprocessor, including at least one CPU, a non-volatile memory like a Flash EEPROM, a RAM, interface components for interfacing with the mobile communications device 115. The detailed structure of the SIM is not shown being per-se known.

Referring back to FIG. 1, the security policies enforcement platform has a client-server structure, and includes a client side 135 and a server side 140, adapted to communicate and cooperate with each other.

The server side 140 of the platform (hereinafter referred to as the platform server) is located at the mobile network operator 110. The platform server 140 manages activities, including the definition of the security policies to be implemented at the users' mobile communications devices, and of the conditions under which specific security policies need to be implemented, the storage of the security policies in a central security policy database 143, and the communication of the security policies to the mobile communications devices, exploiting one or more of several available communications channels.

The client side 135 of the platform (hereinafter, the platform client) is located at the mobile communications device 115, and includes a dedicated client software installed on and executed by the mobile communications device 115. The platform client 135 is in particular adapted to communicate with the platform server 140 for, e.g., receiving the security policies and other signaling, to locally store the received security policies, and to enforce the security policies locally to the mobile communications device 115.

A detailed description of the platform client 135 and server 140 is provided later on.

The platform server 140 includes an event collection function 145 adapted to capture, from a plurality of different sources, events useful for the operation of the security policy enforcement platform, particularly events useful for determining which security policies should preferably be applied. The event collection function 145 may capture events from an early warning platform 150 (a platform operating on the base of anomaly detection mechanisms and adapted to detect attacks by malware before the latter is intercepted by other mechanisms, like anti-viruses, that operate based on pattern—e.g., virus signature—detection), a context awareness platform 155, a network intrusion detection system 160, an anti-fraud system 165, a presence detection system 170 of an enterprise, as well as other possible sources (globally indicated as 175).

The platform server 140 is adapted to communicate with the mobile communications devices, and particularly to send thereto the security policies to be enforced, exploiting one or more of several communications channels, including messages of an SMS (Short Messaging Service) and/or of an MMS (Multimedia Messaging Service) of the mobile communications network 105, data packets sent over a TCP/IP connection established exploiting the GPRS infrastructure of the mobile communications network 105, a ZigBee communications channel, a Bluetooth communications channel, an IrDA communications channel.

For the purposes of the present description, by "security policy" there is meant a policy that is characterized by one or, generally, more, e.g. a set of rules. In particular, albeit not limitatively, the rules making up a generic security policy may be composed by assigning specific values to elements called "attributes" (according to the nomenclature adopted by the NIST—National Institute for Standard and Technology). Depending on the specific values assigned to the attributes in a policy, the platform client 135 resident on the mobile communications device 115 is able to manage authorizations and/or privileges of users and applications in accessing the resources and the services made available by the mobile device.

According to an embodiment of the invention, a policy may be defined using the XML (eXtensible Markup Language). In this case, a policy may be expressed as a sequence of attributes and specific values assigned thereto, like the following:
<PolicyEntry attribute1="value1" attribute2="value2" . . . >,
and one or more lines of attribute values assignment can be composed to define a policy.

Merely by way of non-limitative example, as known to those skilled in the art of security policies, the NIST defines at least three types of attributes that have to be used for defining a security policy: "action" attributes, "source" attributes and "target" attributes (however, the present invention is not to be construed as limited to the definitions by the NIST).

Action attributes represent the controls to be managed by the entity responsible of the enforcement of the policy. The NIST has defined three values for an action attribute: "interface", "socket" and "file". The interface attribute value indicates controls at the communications physical level of the OSI stack (for example, in a generic, general-purpose computer these include controls for assessing if a serial port, an infrared port, the access to the smartcard or to a memory card are enabled). The socket attribute value indicates controls at the OSI transport level. The file attribute value indicates controls at the OSI application level: it allows restricting access to specific files only to certain software applications; a policy may be further refined, indicating every single read, write and execution permissions.

Source attributes specify values adapted to restrict the possibility of assignment of the action attribute; objects for which a source attribute is specified may include IP addresses, file names, etc. In the case of a socket action, the source attribute includes several sub-parameters indicating for example the numbers of the ports enabled to the Internet traffic, a range of addresses to which the user is authorized to connect, and so on.

Target attributes further specify interface elements or references that complete the action.

Merely by way of non-limitative example, the security policies that the security policy enforcement platform according to the invention embodiment herein described may manage may include: policies for the activation and the configuration of the VPN client (assumed to be included in the VPN module 285) resident on the users' mobile communications devices; policies for the activation/deactivation/configuration of the personal firewall 290; policies for the activation/deactivation of the camera 230; policies for the activation/deactivation/configuration of the Bluetooth interface 270, the IrDA interface 275, the Wi-Fi interface 265; policy for the activation/deactivation/configuration of the GPRS/EDGE/UMTS functionalities 215; policies for the encryption of data locally stored at the mobile communications device 115 (e.g., for the encryption of a local file system or of files/folders of files); policies for the activation/deactivation/configuration of a data backup service possibly implemented on the mobile communications device 115; policies for the activation/deactivation of specific applications installed on the mobile communications device 115 or policies for preventing the installation of new applications on the mobile communications device 115. The above list is not exhaustive.

According to an embodiment of the present invention, the generic security policy is made up by one or more rules belonging to one of two rules categories: rules in XML format, and rules in configuration file format.

The use of the XML format for the security policy rules is considered preferable, because often operating systems allows defining policies in native XML format, also thanks to some emerging standards like the OMA Device Management; for example, assuming that the operating system installed on and governing the operation of the mobile communications device 115 is Windows Mobile®, it is possible to configure via XML the VPN client of the VPN module 285, the configuration of the GPRS connections, the configuration of the Wi-Fi interface 265, etc.

Security policy rules in the configuration file format are used to take into account the existence of applications whose configurations do not support XML. The security policies in the configuration file format thus allow acting on applications configurations that depend on specific files. This allows for example acting on the settings of third-part applications that keep their configurations in text files (like the files having the extension ".ini" in the Microsoft Windows® environment), instead of binary files.

A generic security policy may be identified by an identifier, e.g. alphanumeric, and, according to an embodiment of the present invention, it is protected, in terms of integrity and authenticity, by means of a suitable mechanism, adapted to ensure that the platform client 135 and the platform server 140 have the possibility of checking the authenticity and integrity of the security policy; in particular, as will be described later, in an embodiment of the present invention a cryptographic Message Authentication Code (MAC) mechanism is adopted. As known, a cryptographic MAC is a relatively short piece of information that may be used to authenticate a block of data like a message. The MAC is generated by a MAC algorithm, which accepts as input a secret key and an arbitrary-length block of data to be authenticated, and outputs a MAC (sometimes known as a tag). The MAC value protects both the integrity and the authenticity of the block of data, by allowing verifiers (who also possess the secret key) to detect any changes to the block of data content. A MAC algorithm can be constructed from other cryptographic primitives, such as cryptographic hash functions (as in the case of HMAC) or from block cipher algorithms (OMAC, CBC-MAC and PMAC).

A policy may be introduced by a specific XML tag, like the following Policy id tag:

```
<Policy id= "POLICYNAME" mac="POLICYMAC">
    ....body of the policy
</Policy>
```

The attribute id="POLICYNAME" indicates the alphanumeric code that identifies the policy, whereas the attribute mac="POLICYMAC" contains the MAC calculated over the security policy, for example encoded using the base64 coding.

As mentioned in the foregoing, a security policy is made up of one or more rules, each of which contains a setting or a configuration for the system on which the security policy has to be enforced, in the instant case the mobile communications device 115. In order to distinguish the security policy rules from each other, according to an embodiment of the present invention a method is provided that is adapted to specify the content of a generic rule. To this purpose, a further XML tag is introduced, that allows determining the rules included in a policy:

```
<Rule id="RULENAME" type="RULETYPE">
    ... body of the rule
</Rule>
```

The attribute id="RULENAME" may be an integer identifying a particular rule, whereas the attribute type="RULETYPE" indicates the type of rule being defined. The rule type attribute may take one of the following values:

type attribute value "XML": this attribute value identifies the security policy rules in XML form;

type attribute value "FILE": this attribute value identifies the security policy rules in the configuration file form.

It is observed that by properly structuring a security policy in rules containing each the settings and the configurations related to a same function of the system (the mobile communications device 115) on which the security policy has to be enforced, the maintenance, e.g. the updating of the security policy is made easier. For example, the activation of the VPN function 285 on a mobile communications device is comprised of several configurations (configuration of the VPN client, configuration of the communications interface, etc.)

which are preferably grouped in a same rule. In this way, a security policy may be updated with a granularity equal to a single rule.

Temporary security policies may be provided for, with the purpose of managing situations in which a certain security policy has to be considered valid for a time period not determined in advance. A temporary security policy may redefine the behavior of some security policy rules. For example, let the case be considered in which a new threat or a new vulnerability is discovered and published (e.g., on a security bulletin) that may affect a component of the mobile communications device, and for which a remedy (for instance a patch) has not yet been released. A temporary security policy, implementing a workaround, may be enforced on the mobile communications device adapted to provide a temporary solution adapted to at least limit the possible damages, possibly by deactivating or limiting the functionalities offered by the involved component. As soon as the problem is solved, and a remedy is made available to the threat, the temporary security policy is deactivated. As will be described later, in the platform according to an embodiment of the present invention, the activation and deactivation of the temporary security policy on the mobile communications device is accomplished by (means of a command from) the platform server.

The platform server 140 and the platform client 135 communicates with each other by exchanging suitably formatted messages, over one of the available communications channels.

In an exemplary but not limitative embodiment of the present invention, the generic message exchanged between the platform server 140 and the platform client 135 is composed of a plurality of XML tags, for example adapted to describe the type of the security policy being transported by the message, plus possible control information.

The generic message may be encapsulated within a predetermined XML tag, e.g. a "Message" tag, defined as:

```
<Message mac="MESSAGEMAC" time="YYYYMMDDhhmmss">
    ... body of the message
</Message>
```

The attribute mac="MESSAGEMAC" contains a MAC calculated over the entire message, for example coded with the base64 coding, and represents a protection mechanism of the message, particularly a cryptographic integrity check aimed at preserving the message authenticity and integrity.

For example, the MAC present in a message received from the server side 140 is exploited by the client side 135 of the platform resident on the mobile communications device 115 for verifying the message authenticity and integrity, as will be described in detail later.

In an embodiment of the present invention, the "Message" tag also includes an attribute time="YYYYMMDDhhmmss", whose value indicates the date and time at which the message has been dispatched (in particular, the date and time at which the message to be dispatched has been passed to the transport OSI layer). The value "YYYYMMDDhhmmss" of the "time" attribute is for example the concatenation of the year (in 4-digit format), of the month (in 2-digit format), of the day (in 2-digit format), of the hour (in 2-digit format), of the minute (in 2-digit format) and of the second (in 2-digit format); other formats are however possible. Provided that the local clocks of the platform server 140 and of the platform client 135 are synchronized, the value of the "time" attribute may be exploited for performing further checks on a received message.

Different types of messages can be exchanged between the platform server 140 and the platform client 135. For example, in an embodiment of the present invention, four different types of messages can be exchanged: "Action" messages, "Request" messages, "Reply" messages and "Notify" messages. The sender and the recipient of any of these messages may be either the platform server 140 or the platform client 135.

An Action message relates to an action that has to be performed by the message recipient. A Request message relates to a request to which the message recipient is asked to respond, by means of a Reply message; a Notify message is used to notify a certain condition of the message sender.

The type of message is for example defined by means of a specific XML tag; for example, in the case of an Action message, the following tag is used:

```
<Action type="ACTION">
    ... body of the action
</Action>.
```

The attribute type is used to identify the type of action to be taken; for example, in an embodiment of the present invention, four actions are envisaged, corresponding to four values of the type attribute:

type attribute value "STORE": this instructs the platform client 135 to locally store the security policy transported by the message and contained in the body of the action;

type attribute value "DELETE": this instructs the platform client 135 to delete a (possibly, one or more) security policy specified in the body of the action (only an identifier of the policy needs to be included in the body of the action);

type attribute value "UPDATE": this instructs the platform client 135 to update the security policy based on the content of the body of the action (which needs to include the identifier of the security policy, and the one or more rules thereof that need to be updated);

type attribute value "APPLY": this instructs the platform client 135 to apply the security policy included in the body of the action (assuming that the policy to be applied has previously been dispatched to the platform client 135, by means of a STORE Action message, it is sufficient to specify in the body of the action the identifier of the security policy).

In the case of an APPLY Action message, a sub-tag may be further provided, e.g. <Expire time="YYYYMMDDhhmmss">, allowing to specify until which date and time the security policy specified in the body of the action can be applied. The tag may have the following form:

```
<Action type="APPLY">
    <Expire time="YYYYMMDDhhmmss">,
        ... Policy to be applied
    </Expire>
</Action>.
```

The date and time may be formatted as described in the foregoing. When the date and time specified for applying the policy expires, the platform client 135 may apply the security policy that was previously active; in case the previously active policy results to be no more available locally to the mobile communications device 115 or no more integer (for instance due to a fault of the mobile communications device 115, a user error, or a malicious attack, deduced exploiting the policy MAC, as described in the following), the platform client 135 may apply a default security policy, and notify the platform server 140. A default security policy is for example a conservative security policy that is applied in particular situations, like at the first execution of the platform client 135 on a particular mobile communications device, or when no policies are available at the mobile communications device, or in case of critical errors, and in similar situations.

In the case of a Request message, the following tag is used:

```
<Request type="REQUEST">
    ... body of the request
</Request>.
```

The attribute type is used to identify the type of request. In an embodiment of the present invention, two types of requests are envisaged:

type attribute value "KNOWN": this identifies a request (from the platform server 140 to the platform client 135) to send all the security policies locally stored (at the client side 135);

type attribute value "ACTIVE": this identifies a request (from the platform server 140 to the platform client 135) to send the security policy currently applied (on the platform client 135);

In the case of a Reply message, the following tag is used:

```
<Reply type="REPLY">
    ... body of the reply
</Reply>.
```

The attribute type is used to identify the type of reply. In an embodiment of the present invention, two types of replies are envisaged:

type attribute value "KNOWN": this identifies a reply to a request (from the platform server 140 to the platform client 135) to send all the security policies locally stored (on the platform client 135); all the security policies locally stored are integrally transmitted.

type attribute value "ACTIVE": this identifies a reply to a request (from the platform server 140 to the platform client 135) to send the security policy currently applied (on the platform client 135); the currently active security policy is integrally transmitted.

Finally, in the case of a Notify message, the following tag is used:

```
<Notify type="NOTIFICATION">
    ... body of the notification
</Notify>.
```

The attribute type is used to identify the type of notification. In an embodiment of the present invention, two types of notifications are envisaged:

type attribute value "ANOMALY": this identifies a notification concerning an anomaly;

type attribute value "ERROR": this identifies a notification concerning an error condition.

In order to identify the cause of the anomaly or error condition, a further tag may be introduced, as follows:

```
<NotifyInfo message_id="#" [policy_id="ID" [rule_id="#"]]>
    ...error code
</NotifyInfo>
```

The value of the attribute message_id="#" identifies the message that generated the error condition (such an identifier is for example communicated by the OSI transport layer to the module of the platform server or the platform client that takes on responsibility of managing the message). The attributes policy_id="ID" and rule_id="#" are optional, and are used to identify the security policy and the respective rule to which the error code relates.

The table below reassumes the possible messages that may be exchanged by the platform server 140 and the platform client 135, in an exemplary embodiment of the present invention.

| Message | Type | Sender | Recipient | Description | Policy(ies) transported? |
|---|---|---|---|---|---|
| Request | KNOWN | server side | client side | request of policies locally stored on the client | No |
| Request | ACTIVE | server side | client side | request of the currently active policy on the client | No |
| Reply | KNOWN | client side | server side | dispatch of policies locally stored on the client | Yes |
| Reply | ACTIVE | client side | server side | dispatch of the policy currently active on the client | Yes |
| Action | STORE | server side | client side | dispatch of a policy to be stored locally by the client | Yes |
| Action | DELETE | server side | client side | specifies a policy to be deleted by the client | No |
| Action | UPDATE | server side | client side | dispatch one or more rules of a policy stored locally at the client to be updated | partially |
| Action | APPLY | server side | client side | specifies a policy to be applied by the client | No |

| Message | Type | Sender | Recipient | Description | Policy(ies) transported? |
|---|---|---|---|---|---|
| Notify | ANOMALY | client side | server side | notifies the occurrence on the client of an unforeseen situation | No |
| Notify | ERROR | client side | server side | notifies the occurrence on the client of an error | No |

Figure 3:
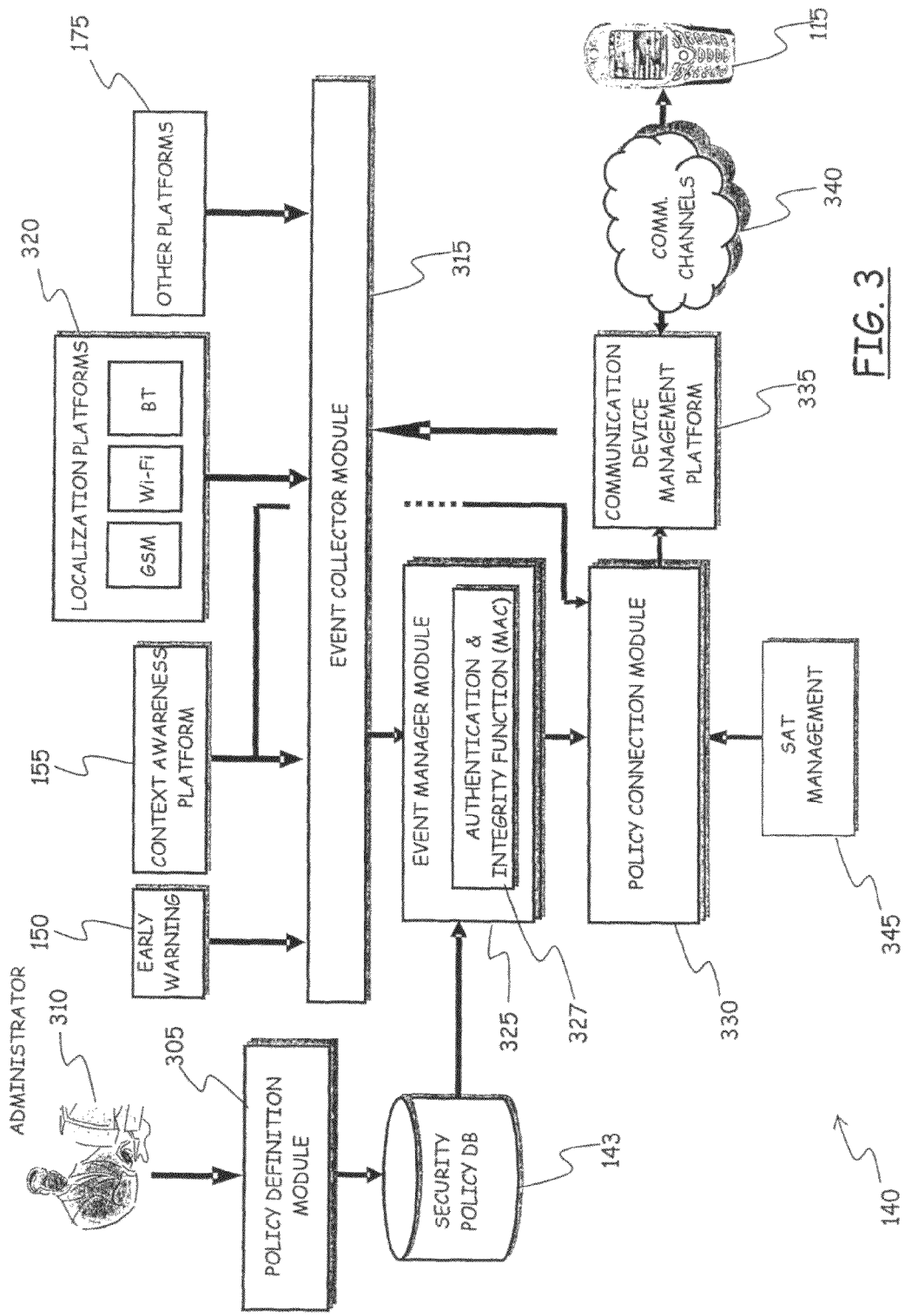
FIG. 3 schematically shows in greater detail, in terms of functional blocks, a server side of the security policy enforcement platform of FIG. 1.

Passing now to FIG. 3, a schematic but more detailed description of the platform server 140 of the security policy enforcement platform is shown.

A policy definition module component 305 allows security administrators 310, i.e. administrators of the security policy enforcement platform (people responsible of the management of the network and of the mobile communications devices) to define security policies to be distributed to, and enforced on the mobile communications devices that have subscribed with the mobile communications network operator 110 for this service. In particular, the policy definition module 305 allows the administrators 310 to create new security policies, modify already existing security policies, e.g. modifying, adding, deleting security rules, delete security policies, define conditions in which specific security policies has to be actuated. The system administrators 310 may for example access the policy definition module 305 and perform the above actions remotely, via a web interface, exploiting one of the known web browsers. This allows some kind of customers, like enterprises/corporations, to autonomously create and manage the security policies that they want to be enforced on the mobile communications terminals of their employees, or of people visiting their premises.

Preferably, the security policy enforcement platform supports the definition of the security policies by the administrators based on rules that are independent from the specific target mobile communications devices; the policy definition module 305 is adapted to translate security policies created by the administrators 310 into a format specific and supported by the desired targets; in this way, the peculiarities of the mobile communications terminals are managed by the policy definition module 305, and made transparent to the administrators 310.

As mentioned in the foregoing, at the platform server 140 the security policies are stored in the central security policies database 143; the database 143 is also used to store the definitions of the conditions causing the security policies to be distributed to and/or actuated on the mobile communications devices. Preferably, the database 143 also stores the security policies that are expected to be already present on the mobile communications devices. The policy definition module 305 interacts with the database 143 for storing newly created security policies, retrieving already existing security policies to be modified or deleted, and for storing the conditions of applications of the security policies. The database 143 is also exploited for storing all the information related to managed mobile communications devices, for instance identified by the IMEI code, and the related software platforms (Windows Mobile, Symbian, SavaJe, etc.) and versions (e.g. Windows Mobile 5.0, Pocket PC 2003 Second Edition, Symbian Series 80, Symbian Series 60, etc.). These data are needed to translate a high level policy (for instance "set Bluetooth interface to non discoverable mode") to the specific XML tag understood by the specific software platform with which the target mobile communications device is equipped (while a security policy may, at a higher level, be the same, the specific commands/syntax may differ in respect of different software platforms, e.g. operating systems).

The database 143 is for example structured as a relational database based on SQL (Structured Query Language), supporting the concurrent access by multiple sources.

The event collection function 145 is implemented by means of an event collector module component 315, that has the function of capturing all the events useful for the operation of the policy enforcement platform. In particular, the event collector module 315 interfaces with several modules/platforms, including the early detection platform 150, the context awareness platform 155, a system 320 of localization platforms adapted to geographically localizing the mobile communications devices, including for example a GSM localization platform, a Wi-Fi localization platform, a Bluetooth localization platform, a GPS (Global Positioning System) localization platform, as well as a network Intrusion Detection System (IDS), an anti-fraud system, a presence detector system of an enterprise, and other possible sources (globally indicated as 175), including for example security bulletins, software update bulletins.

The event collector module 315 may be adapted to capture events concerning the geographic localization of the mobile communications devices, the context of the users of the mobile communications devices (information about a user's context may include for example, in addition to the localization, environment parameters like the temperature, or the IP address of the user's device, and so on), notifications by IDSs, notifications of availability of software updates of critical applications, notifications of newly discovered threats/vulnerabilities, explicit requests of enforcing specific security policies, received for example by a customer enterprise/corporation; the event collector module 315 is also preferably adapted to receive notifications of the violation of the security policies on the mobile communications devices, error messages from mobile communications devices, and possibly any further event useful for the specific implementation of the security policy platform. The event collector module 315 is adapted to filter the captured events from the different sources to determine which may be relevant and which not.

The event collector module 315 interacts with an event manager module component 325. The event manager module 325 is adapted to interpret the events captured, filtered and forwarded thereto by the event collector module 315, in order to decide which is/are the better security policy/ies to be applied based on the specific situation, as derived from the events captured by the event collector module 315. The event manager module 325 is activated by the receipt of one or more events from the event collector module 315. As mentioned in the foregoing, when a security policy is created, the conditions which will trigger the application of the security policy are also defined, and stored, also in terms of correlation rules among the collected events; the event manager module 325 is adapted to deduce, based on the events received from the event collector module 315, the specific conditions at a certain time, and to build, based on the information stored in the central database 143, the security policy to be enforced on a certain mobile communications device. In building the security policy, account is taken of both the specific mobile communications device software platform, and the specific class of users (Consumer, Enterprise/Corporate) which typically present different security requirements. The event manager module 325 is further adapted to calculate, exploiting an authentication and integrity function 327, the MAC of the policy, using a secret cryptographic key, shared with the SIM 120 contained in the target mobile communications device 115, and to insert it in the security policy for the authenticity and integrity check.

Once the event manager module 325 has determined which is the better security policy to apply on a specific mobile communications device, the event manager module 325 prepares a message to be dispatched to that mobile communications device, and contacts a policy communication module component 330, providing thereto the message to be dispatched. In particular, the event manager module 325 prepares one of the above described messages, according for example to the format described in the foregoing, and in particular the authentication and integrity function 327 calculates the message MAC, using a cryptographic key, shared with the SIM contained into the target mobile communications device (the same key as that used to encrypt the policy MAC, or a different key), and inserts it in the message for the authenticity and integrity check.

The policy communication module 330 dispatches to the mobile communications devices controlled by the policy enforcement platform the messages received from the event manager module 325. In particular, the policy communication module 330 selects the communication channel to be used for dispatching the messages to the mobile communications devices 115, based on the communications channels supported by and available at the moment to the specific mobile communications device. To this purpose, the policy communication module 330 may interact with the context awareness platform 155, exploited for the localization of the mobile communications devices, gathering information about the communication channels that the mobile communications device can use in the current context. The policy communication module 330 may also select the communication channel based on the nature of the message to be dispatched, and on the message length; if a considerable amount of data has to be transmitted, packet switched channels like the GPRS or the Wi-Fi are preferred, if available, to e.g., SMS.

The policy communication module 330 interacts with a communication device management platform 335, adapted to manage the communication devices of the plurality of available communication channels 340.

The policy communication module 330 may also be adapted to manage cases of temporary unavailability of one or more of the communications channels that the context awareness platform 155 indicated as supported by the mobile communications device 115: in these cases, the policy communication module 330 may be adapted to retry the message transmission over different communication channels, even if less efficient than the initially or previously selected channel(s). In the case a mobile communications device results to be at the moment not reachable by any communication channel, the policy communication module 330 may be adapted to retry the transmission, for example at regular time intervals, e.g. for a predetermined number of attempts: if, after the retries, the policy communication module 330 is not able to dispatch the message, a notification to the administrators 310 may be issued.

The policy communication module 330 may also interact with an OTA SIM management platform 345 of the mobile communications network operator 110, particularly a SAT management platform, designed to allow the remote, OTA management of the SIMs 120 of the subscriber users, and particularly of applications implemented on the SIMs compliant to the SAT standard.

Figure 4:
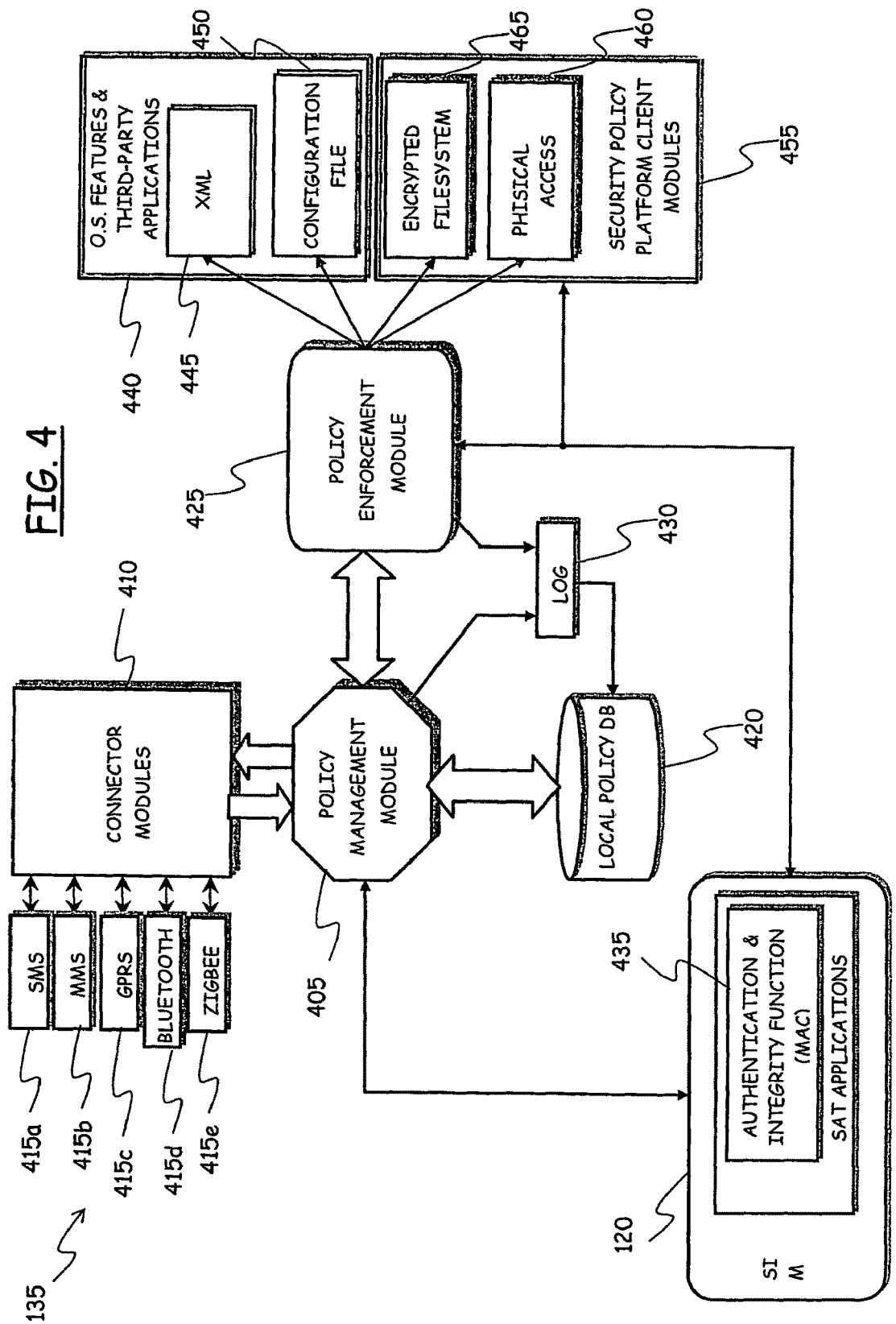
FIG. 4 schematically shows in greater detail, in terms of functional blocks, a client side of the security policy enforcement platform of FIG. 1, adapted to cooperate with the server side of FIG. 3.

In FIG. 4, a schematic but more detailed description of the client side 135 of the security policy enforcement platform is shown.

The main components of the platform client 135 are a policy management module 405, connectors module 410 to multiple communication interfaces 415a-415e of the mobile communication device, a local security policies database 420, a security policies enforcement module 425.

The policy management module 405 is responsible of the management of the security policies and of the commands/ messages received (through the connectors module 410) from the server side 140 of the platform.

The connectors module 410 includes connectors that are responsible of interfacing the policy management module 405 with the plurality of communications interfaces 415a-415e available on the mobile communications device 115, such as an SMS interface 415a, an MMS interface 415b, a GSM/GPRS/EDGE/UMTS interface 415c, a Bluetooth interface 415d, a ZigBee interface 415e; other communication interfaces may be present, like an IrDA interface.

The policy management module 405 interacts with the local security policy database 420, wherein the security policies to be enforced on the mobile communications device are stored. In particular, the local security policy database 420 may be realized as an SQL relational database management system; a practical solution may be to adopt SQLite, which is a C library implementing a light SQL database management system easily integratable with any application based on Windows®, Linux, PocketPC; other database management systems can however be implemented.

The policy management module 405 cooperates with the policy enforcement module 425, responsible of the enforcing of the security policies on the mobile communications device.

A log module component 430 is preferably further provided, for memorizing (for example in the database 420), e.g. in log file in plain text format, information related to the operation of the platform client 135, particularly of the policy management module 405 and of the policy enforcement module 425, even more particularly information useful for a technical support staff to understand the causes of possible malfunctioning of the policy management module 405 and of the policy enforcement module 425.

Figure 5:
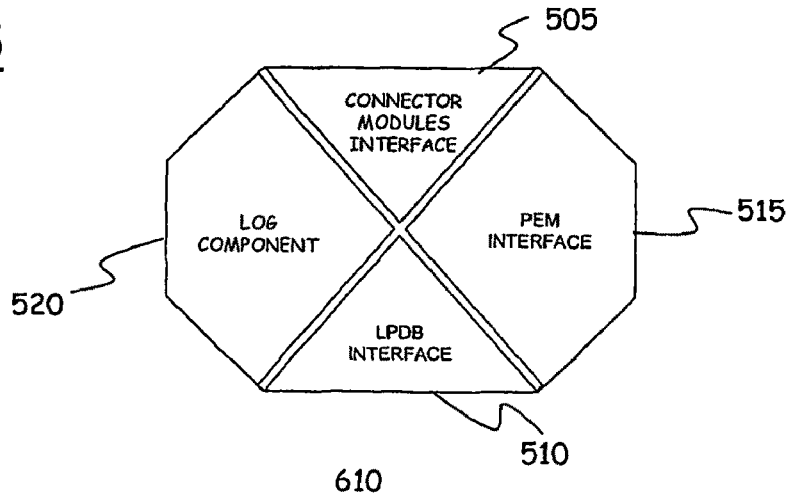
FIG. 5 shows still schematically but in greater detail a policy management module of the client side.

As depicted in FIG. 5, the policy management module 405 may include four main component modules: an interface component 505 for interfacing the connectors module 410; an interface component 510 for interfacing the local security policies database 420; an interface component 515 for interfacing the policy enforcement module 425, and an interface component 520 for interfacing the log module 430.

The interface component 505 towards the connectors module 410 is responsible of interacting with the connectors dedicated to the transport of the messages received from the platform server 140, transporting for example security policies. Multiple transport modes for the security policies are preferably supported by the platform, like for example SMS, MMS, GPRS, UMTS, Wi-Fi, Bluetooth, ZigBee, IrDA, and in general any communications channel supported by the mobile communications device 115 and by the security policies enforcement platform. The details of the specific transport mode adopted are however handled by the connectors in the connectors module 410, and are transparent for the policy management module 405; in other words, the policy management module 405 does not directly manage the low-level communications aspects, and is forwarded the messages received by the connectors module 410. In particular, when a message from the platform server 140 is received, the connectors module 410 notifies the policy management module 405, so that the interface component 505 can take over responsibility of the message.

The interface component 505 checks the authenticity of the generic received message; to this purpose, the interface component 505 interacts with the SIM 120 and exploits an authentication function 435 resident therein, particularly a SAT authentication function 435.

In particular, the interface component 505 invokes the SAT authentication function 435 resident in the SIM 120, which is entrusted, by the policy management module 405, the check the attribute mac="MESSAGEMAC" included in the "message" tag, that, as discussed in the foregoing, contains the (base64 coding of the) MAC calculated over the entire message dispatched by the platform server 140. The SAT authentication function 435 performs the check, by recalculating the MAC over the entire message as received, and comparing it to the value included in the received message, and communicates the result to the interface component 505. For calculating the MAC, the SAT authentication functions exploits a same cryptographic key, stored in the SIM in protected way, as that used by the event manager module 325 of the platform server 140 for originally calculating the MAC upon preparing the message (i.e., the authentication function at the platform server and that implemented in the SIM shares a secret).

The interface component 505 may be adapted to reject the message, and to cause the dispatch a corresponding notification to the platform server 140 (the delivery of the notify message is handled by the connector modules 410) in case the check reveals that the message is not authentic or not integer.

The interface component 505 may further be adapted to check the timestamp of the received message, looking at the value of the attribute time, and to discard the message in case it is ascertained that the message is too old (a predetermined time window may be defined), in which case the interface component 505 may invoke the connectors module 410 to send a corresponding notify message.

The interface component 505 is further adapted to analyze the received message so as to determine the nature of the message (for example, discriminating between an Action message and a Request message).

In the case the interface component 505 ascertains that the received message is a Request message, using the interface component 510 for interfacing the local security policies database 420 the interface component 505 is adapted to retrieve from the local database 420 the security policy or policies to be transmitted to the platform server 140; in particular, the interface component 505 includes, in the Reply message, the security policy identifier(s) and the corresponding policy MAC(s), so as to enable the server side 140 to ascertain the authenticity of the security policy stored at the platform client 135, and to determine whether it needs to be updated.

In the case the interface component 505 ascertains that the received message is an Action message, the interface component 505 is adapted to ascertain which action has to be taken.

In particular, if the interface component 505 ascertains that the requested action is to store a security policy transported within the received message (value STORE for the type attribute), the interface component 505 is adapted to extract the security policy from the message, and to invoke the interface component 510 for storing the security policy in the local security policies database 420. This is performed invoking the SAT authentication function 435 resident on the SIM 120 to check both the authenticity and the integrity of the received policy, prior to storing it in the local policy database 420.

If the interface component 505 ascertains that the requested action is to update a security policy already stored in the local database 420 (value UPDATE for the type attribute), the interface component 505, invoking the interface component 510, updates the specified policy rule(s) in the local database 420; this may involve modifying, adding and/or deleting the previous rules. Then, the interface component 505 ascertains whether the MAC indicated in the update policy message corresponds to the MAC calculated over the overall updated policy. To this purpose, the update policy message may contain both the changes to be applied to a specific security policy, and the MAC computed on the final (updated) security policy, including the rules unchanged (and therefore not retransmitted). This approach provides better bandwith consumption and detects synchronization issues between the polices stored on the client and on the server components.

If the interface component 505 ascertains that the requested action is to delete a security policy stored in the local database 420 (value DELETE for the type attribute), the interface component 505, invoking the interface component 510, communicates thereto which is the security policy to delete.

If the interface component 505 ascertains that the requested action is to apply a security policy stored in the local database 420 (value APPLY for the type attribute), the interface component 505 invokes the interface component 515 that interfaces the policy enforcement module 425, and communicates thereto which is the security policy to be applied. Preferably, before invoking the policy enforcement module 425, the policy management module 405 invokes the authentication function 435 on the SIM 120 to check the policy MAC, so as to ensure that the security policy going to be applied is authentic and integer (malware attacks may indeed compromise a security policy stored in the local database 420).

During its operation, the interface component 505 is adapted to manage error conditions; the errors that may be encountered may be:

in the case of a received request to store a security policy, the fact that the specified policy is already present in the local database 420;

in the case of a received request to update a security policy, the fact that the specified security policy is not present in the local database 420, or that the MAC of the updated security policy is not correct;

in the case of a received request to delete a security policy, the fact that the specified security policy is not present in the local database 420;

in the case of a received request to apply a security policy, the fact that the specified security policy is not present in the local database 420, or the MAC of the specified security policy is not correct;

In all these cases, the policy management module 405 is adapted to dispatch a notification to the server side 140.

The interface component 515 is responsible of interacting with the policy enforcement module 425, so as to send thereto the security policies to be applied.

The interface component 510 to the local database 420 is responsible of archiving in the local database the security policies received from the server side 140 and passed through the interface component 505. Preferably, the interface component 510 is the only module responsible of the management of the local database 420, so that every other functional component of the platform client 135 wishing to access the local database 420 has to invoke the interface component 510 of the policy management module 405; preferably, the interface component 510 supports multiple simultaneous accesses to the local database 420. Thanks to this, the specific structure of the local database 420 is made transparent to the remaining functional components, and it is possible to modify the database structure without impacting the operation of the remaining functional components.

The interface component 520 for interfacing the log module 430 provides services to the remaining components of the policy management module 505, and receives therefrom information concerning the operation of the various components of the policy management module 505 to be stored in the log file.

The main task of the policy enforcement module 425 is that of enforcing the security policies. In particular, the policy enforcement module 425 applies the security policy from time to time communicated thereto by the policy management module 405, and controls that the applied security policies are not violated by the user of the mobile communications device 115 or by an application (possibly a malware) running thereon.

The integrity and authenticity of the security policies to be applied, communicated by the policy management module 405 to the policy enforcement module 425, are guaranteed by the fact that the security policies are communicated directly together with the respective MAC; in this way, any change to the security policies can be detected by invoking the authentication function on the SIM 120 for verifying the correctness of the MAC. This may be done by the policy management module 405, as described above, and possibly also by the policy enforcement module 425, when invoked to enforce a security policy.

Figure 6:
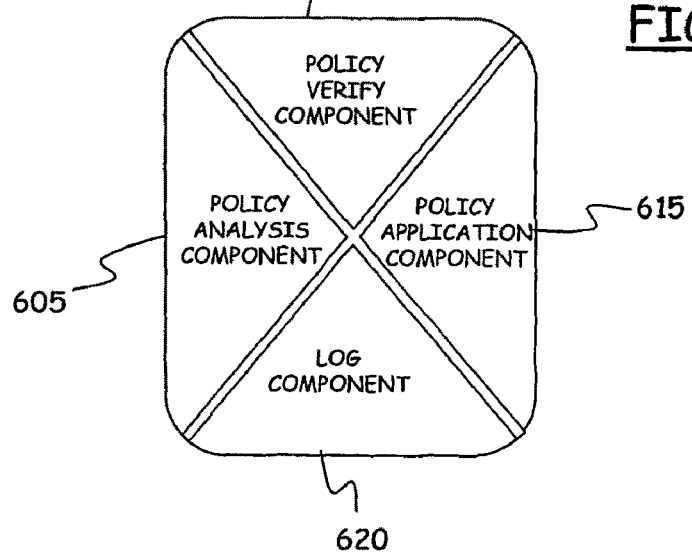
FIG. 6 shows still schematically but in greater detail a policy enforcement module of the client side.

As depicted in FIG. 6, the policy enforcement module 425 may include four main component modules: a policy analyzer component 605, a policy verifier component 610, a policy application component 615, and an interface component 620 for interfacing the log module 430.

The policy analyzer component 605 is responsible of interpreting the security policies received from the policy management module 405, and of understanding the rules making up the security policies. In particular, the policy analyzer component 605 is adapted to extract, from the security policies described in XML format stored in the local database 420, the single security rules, and to organize them in a form suitable for applying them and verifying their application. The policy analyzer component 605 is also adapted to determine the nature of every single rule making up a security policy.

In case the policy analyzer component 605 ascertains that the security policy to be applied is determined to be correct, it is forwarded to the policy application component 615, for the application thereof.

In case instead a security policy is determined not to be correct (for example, it is not correctly structured, syntactically or semantically), the policy analyzer component 605 does not send it to the policy application component 615, and instead notifies the interface 515 of the policy management module 405, and the log interface component 620. In this case, the policy analyzer component 605 may be adapted to instruct the policy application component 615 to apply a default policy (for example, adapted to disable all services that are considered dangerous for the security of the mobile communications device 115 and of the data stored therein, like for example the Bluetooth, the Wi-Fi, and the like).

The policy application component 615 is adapted to receive from the policy analyzer component 605 the security policy to be applied. The single rules making up the policy are applied based on their type: for example, in case of rules in Microsoft XML format, the policy application component 615 is adapted to use the standard API function DMProcessConfigXML ( . . . ), to which the rule at issue is passed.

In the case that, during the application of a rule, an error occurs, the policy application component 615 notifies the event to the interface 515 of the policy management module 405, and the log interface component 620. The policy application component 615 may in this case be adapted to apply default policy, in substitution of the policy that produced the error.

The policy verifier component 610 is responsible of controlling that the active security policy is not violated. To this purpose, a specific verify procedure may be defined for each setting and/or configuration that can be controlled via the policy enforcement platform. For example, the activation of the Bluetooth functionality may be associated with a verify procedure aimed at controlling that the Bluetooth interface is activated or not.

This allows great flexibility in the management of the control of the security rules.

In order to further enhance flexibility, the policy verifier component 610 may be structured in modular form, in such a way that every verify procedure may be a plug-in integrated in the component with necessitating deep modifications.

The check of the active security policy may preferably be carried out at regular time intervals. In case a violation of one or more of the security rules of a policy is detected, the policy verifier component 610 is adapted to:

reset the system configuration (settings and/or configurations) according to what specified in the active security policy;

dispatch a notify message to the platform server 140, to notify an anomaly;

visualize on the screen of the mobile communications device a message indicating the rule(s) that should not be violated.

The interface component 620 for interfacing the log module 430 provides services to the remaining components of the policy management module 525, and receives therefrom information concerning the operation of the various components of the policy management module 525 to be stored in the log file.

The connectors module 410 is responsible of receiving from, and forwarding to the multiple communications interfaces the messages received from the platform server 140 or from the policy management module 405 of the platform client 135.

In the following, merely by way of example, the operation of an SMS transport connector included in the connectors module 410 for managing the communications via SMS messages is described.

The SMS communications channel may for example be exploited by the server side 140 of the platform for the OTA update of the security policies stored on the mobile communications devices. The SMS channel ensures that the mobile communications devices are reached, and is rather fast and simple to manage. However, the plain SMS protocol does not guarantee that the SMS messages are actually dispatched, nor that they are delivered in the same order they are sent. Thus, it is not prudent to send the file with, e.g., the update of a security policy simply fragmenting it in two or more chunks to be sent with different SMS messages.

In the following, an exemplary protocol is described that allows overcoming the above limitations.

Figure 7:
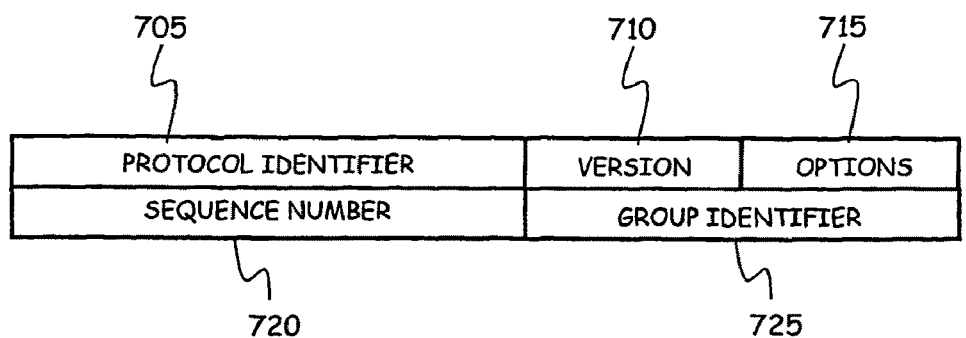
FIG. 7 schematically shows an exemplary header added to an SMS message for transporting security policies from the platform server to a platform client, or vice versa, in an embodiment of the present invention.

In particular, as depicted schematically in FIG. 7, a message header is defined, to be introduced into every SMS message used to transport, e.g., the update of a security policy. The message header is structured so as to allow the message recipient (the client 135 on the mobile communications device 115) to properly reconstruct the file of the security policy.

The SMS message header is for example 64-bit long, and includes for example five fields: a protocol identifier field 705, a version field 710, an options field 715, a sequence number field 720, and a group identifier field 725.

The protocol identifier field 705 is a sequence of bits identifying the protocol; the version field 710 identifies the version of the protocol; the options field 715 specifies options; the sequence number field 720 stores a number identifying that specific SMS message within a sequence of SMS messages; the group identifier field 725 stores an identifier of the group of messages to which the specific SMS message belongs.

As known, the generic SMS message may include up to 140 bytes of data; with the above mentioned message header of 8 bytes, 132 bytes remain in each SMS message to transfer data. Assuming that the sequence number field 720 occupies 16 bits, a generic message may be fragmented in up to 65,535 SMS messages, each carrying 132 bytes of data, for a total of 8,650,620 (approximately 8 MBytes). It is however preferable not to send overlong messages, made up of many fragments, for avoiding possible congestion of the mobile communications device.

The presence of the protocol identifier field 705, having a constant value for every SMS according to this protocol, allows the mobile communications device to distinguish between a generic SMS message in binary form, and an SMS message from the platform server 140, transporting for example a security policy; the mobile communications device may thus process the SMS message without displaying a receipt notification to the user.

The group identifier field 725 allows the mobile communications device 115 that receives the message to distinguish among messages related to different transmissions. A mobile communications device may in fact receive simultaneously two or more sequences of SMS messages, and the group identifier allows to determine to which group a generic SMS message belongs, so as to properly recompose the file relating to a certain security policy. The group identifier field 725 may for example store a (16 bits) pseudo-random code, generated by the message sender (e.g., the platform server 140) in respect of each sequence of SMS messages to be sent.

The sequence number field 720 contains a number adapted to allow the recipient of the SMS message to determine where, within the sequence, that specific SMS message is collocated. The message recipient may also exploit this field to start a timer: for example, when the first SMS message of a certain sequence is received (as indicated for example by the value 1 in the sequence number field 720), a timer is triggered; if, after a predetermined time interval, the sequence is not yet completed, the message recipient may discard all the sequences of that sequence already received, and ask the message sender to re-send the whole sequence.

In order to determine which is the last SMS message of a sequence, the options field 715 is exploited. The options field 715 may be made up of two fields: a more fragment fields 715-1, of 1 bit, and an additional field 715-2, of seven bits, for possible evolutions of the protocol. The more fragments field 715-1 may be used as a flag to inform that the current message is the last of a sequence (bit set to "0", for example). When the recipient of the SMS message ascertains that the more fragments field 715-1 is set to "0", it ascertains that all the messages of the sequence have been received (to do so, the sequence numbers of all the received SMS messages of a certain group are checked), and that the sequence is complete. Duplicated messages may be discarded. In case the sequence is complete, the file of the security policy is reconstructed. If instead it is ascertained that the sequence is not complete, the message recipient may ask the message sender to re-send the sequence of SMS messages.

It is observed that due to the nature of the SMS protocol, it is better to avoid sending overlong files; for example, Action messages for storing a policy, or Reply messages, are preferably not sent via SMS, if any alternative communications channel is available.

The policy enforcement module 425 applies the security policies, i.e. the settings and/or configurations specified in the policies rules, to the specified functions, services, applications, modules of the mobile communications device 115; these include features controlled by the operating system and of third-party applications resident on the mobile communications device 115, globally denoted by 440, which can include settings and/or configurations that are specified in XML form 445, and settings and/or configurations specified in configuration file form 450. Functions, services, applications that are specific of the platform client 135 may also be implemented and controlled through security policies; these functions, globally indicated by 455, may include for example a function 460 controlling the physical access of the user to the mobile communications device, and a function 465 for the encryption of the file system, or of files or folder of files of the mobile communications device 115.

For example, the function 460 controlling the physical access of the user to the mobile communications device may be adapted to increase the conventional protection mechanisms that regulate the physical access to a mobile communications device like a mobile phone by a user, such conventional mechanisms usually require, at the boot of the device, and/or after a predetermined time of inactivity, the inputting of a user-defined password; a coded version of the password is usually stored on the mobile communications device. According to an embodiment of the present invention, in order to enhance security, the password is stored in protected form in the SIM 120; at the device boot, and/or after a predefined inactivity time, the function 460 implemented in the security platform client 135 may request the inputting of a PIN (Personal Identification Number), e.g. a 6-digit number. The PIN, together with an identifier of the mobile communications device, like the IMEI for a mobile phone, is then passed to the authentication function 435 of the SIM. The authentication function 435 checks the PIN correctness, and, exploiting the mobile communications device identifier, it may further check whether that device is entitled to interact with the SIM (this may for example be accomplished by checking that the combination of IMEI and IMSI—Identifier of the SIM—is valid). The function 460 may be adapted to block the SIM after a predetermined number (e.g., configurable by the security administrators 310) of erroneous PIN inputtings. In this way, both the SIM and the mobile communications device are blocked (to unblock them, the subscriber or authorized user may be requested to contact an unblock service managed by the network operator).

The file system/file encryption function 465 is adapted to encrypt the whole file system, or single files or file folders;

this may be in particular useful in connection with mobile communications devices managing external, removable storage supports, like memory cards: in this way, a secure data archive may be created. The files may be encrypted using a session encryption key, generated by the SIM. A header may be added to an encrypted file, containing a ciphered version of the session key, ciphered with a master key contained in the SIM, e.g. in the authentication function 435. In this way, the master key is never communicated out of the protected SIM memory. During the encryption, the encryption function 465 invokes an encryption function implemented in the SIM, e.g. a SAT application, e.g. the authentication function 435, and gets the session key to be used for the encryption, in clear and ciphered form. During decryption, the encryption function 465 reads the header of the encrypted file, to find the ciphered session key, the file header is passed to the SAT encryption function on the SIM, which provides the session key in clear (using the secret master key). The encryption function 465 uses the session key to decrypt the file. Any one of the known encryption algorithms may be used: AES, RC6, Blowfish, 3DES, or any other block or stream symmetric encryption algorithm.

The enforcement and verification of the desired security policies on the mobile communications device 115 may be guaranteed provided that it is guaranteed the proper execution of the platform client 135. Thus, it should be guaranteed that the platform client 135 be always in execution whenever the mobile communications device 115 is turned on, that the platform client 135 cannot be terminated by the user or by some malware, and that the platform client 135 cannot be uninstalled.

To this purpose, the platform client 135 may be started when the mobile communications device is turned on; on the Microsoft Windows® platforms, this can be achieved for example by setting a suitable register key (HKEY_LOCAL_MACHINE\Init). In order to prevent the client 135 from being terminated, a watchdog device driver may be devised that has the function of ascertaining whether the process of the platform client 135 is in execution; in case the watchdog ascertains that the platform client 135 is not in execution, it launches the platform client 135. The watchdog, being a device driver, is not an autonomous application, that can be terminated, being instead executed within the memory space of the "device.exe" process that manages all the device drivers of the mobile communications device. In order to terminate the watchdog, it is thus necessary to terminate the device.exe process, but in this way all the device drivers of the mobile communications device 115, responsible of the management of the various peripherals, would be terminated, thereby making it unusable the mobile communications device. Preferably, the platform client 135 periodically sends to the platform server 140 a heartbeat message, properly signed using a MAC generated by the authentication function 435 of the SIM 120, so the network operator can readily detect a misuse of the mobile communications device 115. For security reasons, the cryptographic key contained within the SAT application resident on the SIM and used by the platform client to sign the heartbeats is different from that (those) used to verify the authenticity and integrity of the security policies and the messages.

The policy enforcement platform described in the foregoing allows modifying the security policies available at the mobile communications devices in a way dependent on the context in which the mobile communications device is. To this purpose, information from the context awareness platform 155 are exploited. The context awareness platform 155 is adapted to make available, to requesting applications like for example the event collector module 315 of the platform server 140, information concerning the current context of the mobile communications device 115 and/or of the respective user. For example, the context may be characterized by a plurality of data, like: the mobile communications device localization (derived from localization systems of the GSM, and/or the UMTS, and/or the Wi-Fi, and/or the Bluetooth), the type of mobile communications device (manufacturer, operating system installed, type of screen, etc.), available communications channels (Wi-Fi, Bluetooth, GPRS, EDGE, UMTS, etc.), additional data like the IP address of the mobile communications device.

When the user of the mobile communications device 115, moving, enters for example specified, e.g. restricted areas, the context awareness platform 155 notifies the event collector module 315, and the latter may for example react by deciding that a new security policy, specific for that context, has to be applied on the mobile communications device 115: thus, the platform server 140 may send an Action message requesting to apply the desired security policy to the mobile communications device 115.

The security policy enforcement platform described in the foregoing is adapted to support different types of users/customers.

A first type of supported user may be a consumer user: in this case, assuming that the user does not possess the level of skills necessary for managing the security of his/her mobile communications device, the security policy enforcement platform provides for managing a set of security policies predetermined by the mobile communications network operator. The content of such security policies is totally under responsibility of the network operator, which modifies/updates the security policies in a way transparent to the user, e.g. via SMS or MMS messages, as described in the foregoing. Consumer users may preferably be allowed to select, at any time, one among a set of predefined security levels, for example using a graphical user interface provided in the platform client 135, without having to deal with the details of the security policies that correspond to the different security levels. For example, three different security levels may be envisaged (however, the number of security levels may be lower or higher, and it may be made to depend on the specific user): a base security level, an intermediate security level and a high security level. The base security level may for example be suitable for users having sufficient skills, that wish to maintain a relatively high control of their mobile communications devices. The intermediate security level may be adapted to guarantee a certain level of security, while still leaving to the user a certain freedom, e.g. setting the Bluetooth interface to "hidden", enabling the outward connections but blocking the inward connections, and so on. The high security level may be adapted to users who wish to minimize risks, e.g. deactivating all those functions that are considered dangerous, like the Bluetooth interface and the related services, blocking the inward and outward connections, disabling the automatic execution of applications, inhibiting the access to the messaging (SMS, MMS) functions by the applications, and so on.

A second type of users may be represented by customer enterprises/corporations: in this case, the control of the mobile communications devices of, e.g., employees of the enterprise may be totally or in part entrusted to the enterprise, through the management interfaces of the platform server 140 made available by the mobile communications network operator. For example, the enterprise may wish to prevent the user of a mobile communications device from modifying predefined settings, and the enterprise may be kept constantly informed of the state of the owned mobile communications terminals, and may be allowed to decide, in real time, which security policies to apply on certain mobile communications devices. The platform server 140 may have interfaces (e.g., web-based) though which the enterprise can monitor the security policies applied on the owned mobile communications devices.

The mobile communications network operator maintains full control of the status of the network and of the mobile communications devices, by collecting and processing the data gathered by the event collection function of the platform server 140. Based on said data, the network operator may react by dynamically modifying the security policies applied on the controlled mobile communications devices. The security policies may for example be modified based on predetermined types of events, that may be captured from multiple different platforms. For example, the security policies might be modified responsive to the current geographic location of the mobile communications device (home, office, hotel, etc.), determined by means of the known localization systems with which the security policy enforcement platform interacts, or derived from access control systems (e.g., badges, biometric devices) regulating the access to restricted areas, or the security policy modification might be triggered by signaling from intrusion detection/prevention systems, either managed by the network operator or by a host resident on the mobile communications devices. Furthermore, the modification of the applied security policies might be the consequence of signaling received from other security systems, like anti-fraud systems or by the detection of the presence of a new malware attack.

Merely by way of example, possible classes of events that can cause the modification and/or the application of the security policies installed on the mobile communications devices are listed hereinafter.

A class of events includes user-driven events, by which the user (for example, a consumer user) of the mobile communications device 115 personally selects the security policy to be applied; in this case, the user may decide which security policy to apply among a predefined set of security policies, created by the network operator. The network operator may also update the contents of the specific security policies (e.g., OTA), based on signaling coming from its own systems or third-party systems, in a way transparent to the user. The user may simply select a desired security level, and does not need to know the details of the security policies that will be applied, as discussed in the foregoing.

Localization-driven events may trigger the automatic, OTA modification and/or application of security policies depending on the geographic localization of the mobile communications device, determined for example exploiting the known GSM/UMTS, Wi-Fi, Bluetooth, ZigBee, GPS localizations platforms, physical access control systems, and the like. For example, the security policies may change when the mobile communications device enters restricted areas of an enterprise (for example, the security policies may in this case trigger encryption of the data, disabling the camera, settings for the VPN functions, and the like). The level of restriction of the area wherein the mobile communications device is located may for example be displayed on the screen.

Time-driven events may cause the automatic, OTA modification and/or application of prescribed security policies based on the time; in this case different security policies may be applied depending on the time of the day, the day of the week, etc. This may be useful for enterprise users, having predetermined working days and hours, so as to enable/disable specific applications and/or functions of the mobile communications devices of the employees during/outside the working time.

Terminal-driven events may cause the automatic, OTA modification and/or application of certain security policies responsive to signaling generated by security systems installed on the mobile communications device; in this case, predetermined security policies may be activated based on signaling coming from anti-malware applications, intrusion detection systems, personal firewalls, etc. For example, a notification received by the server 140 of an attack via Bluetooth issued by an anti-malware application 295, a personal firewall 290, an intrusion detection system installed on the mobile communications device may trigger the application of a security policy providing for the temporary disabling of the Bluetooth connectivity on that mobile communications device, or the application of a more restrictive policy ensuring a higher security level.

Network-driven events may cause the automatic, OTA modification and/or application of predetermined security policies responsive to signaling coming from the mobile communications network. In this case, the security policies to be applied are determined on the basis of signaling coming from different systems/platforms like anti-fraud systems (adapted to detect anomalies in the use of radio resources of the mobile communications network), intrusion detection systems (adapted to detect intrusions perpetrated via software), intrusion prevention systems (adapted to detect and block software attacks), network anti-malware (adapted to detect malware on the mobile communications network), anti-spam systems (adapted to filtering junk electronic mail/messages), anti-phishing systems (adapted to detect phishing attacks directed to perpetrating bank frauds), honeypot/honeynet systems (adapted to detect and analyze software attacks by exploiting fake internet sites and devices set up for being visited by hackers so as to study their way of doing, security bulletins, and the like. All these signaling may come from the mobile communications network, and/or the network operator, and/or the customer enterprise(s). These signaling provide information useful for determining the better security policy to be applied, and the target mobile communications devices on which such policy is to be applied. For example, the notification, by a security bulletin, of the publication of a new vulnerability or a new exploit (a piece of malicious code which takes advantage of a vulnerability to make some kind of damage) for a specific software application may trigger the application of a security policy adapted to inhibit the access to that software application by applications not digitally signed (based for example on the security frameworks promoted by Microsoft, Symbian, OMTP, etc.). As another example, intrusion detection systems of the mobile communications network may detect anomalous traffic relating to a certain protocol (due for instance to a new worm spreading); in this case, a security policy may be applied directed to reconfigure the personal firewall of the mobile communications devices so as to inhibit that type of traffic.

Cooperative-driven events may cause the automatic application of predetermined security policies based on a choice operated by the platform client 135 on a generic mobile communications device, responsive to signaling received by other mobile communications devices connected thereto via a short-range connection, e.g. via Bluetooth, ZigBee, NFC, etc. This may be useful in case of malware having a short-range propagation (e.g., over Bluetooth connections), flash worms (worms capable of very rapidly infecting thanks to preliminary detection of the vulnerable hosts): in such cases, a centralized notification may be scarcely efficient, because too slow. This approach may also be useful in case of congestion of the mobile communications network, for example caused by a DoS or DDoS attack, or in case the mobile communications device is out of coverage by the mobile communications network.

Figure 8A:
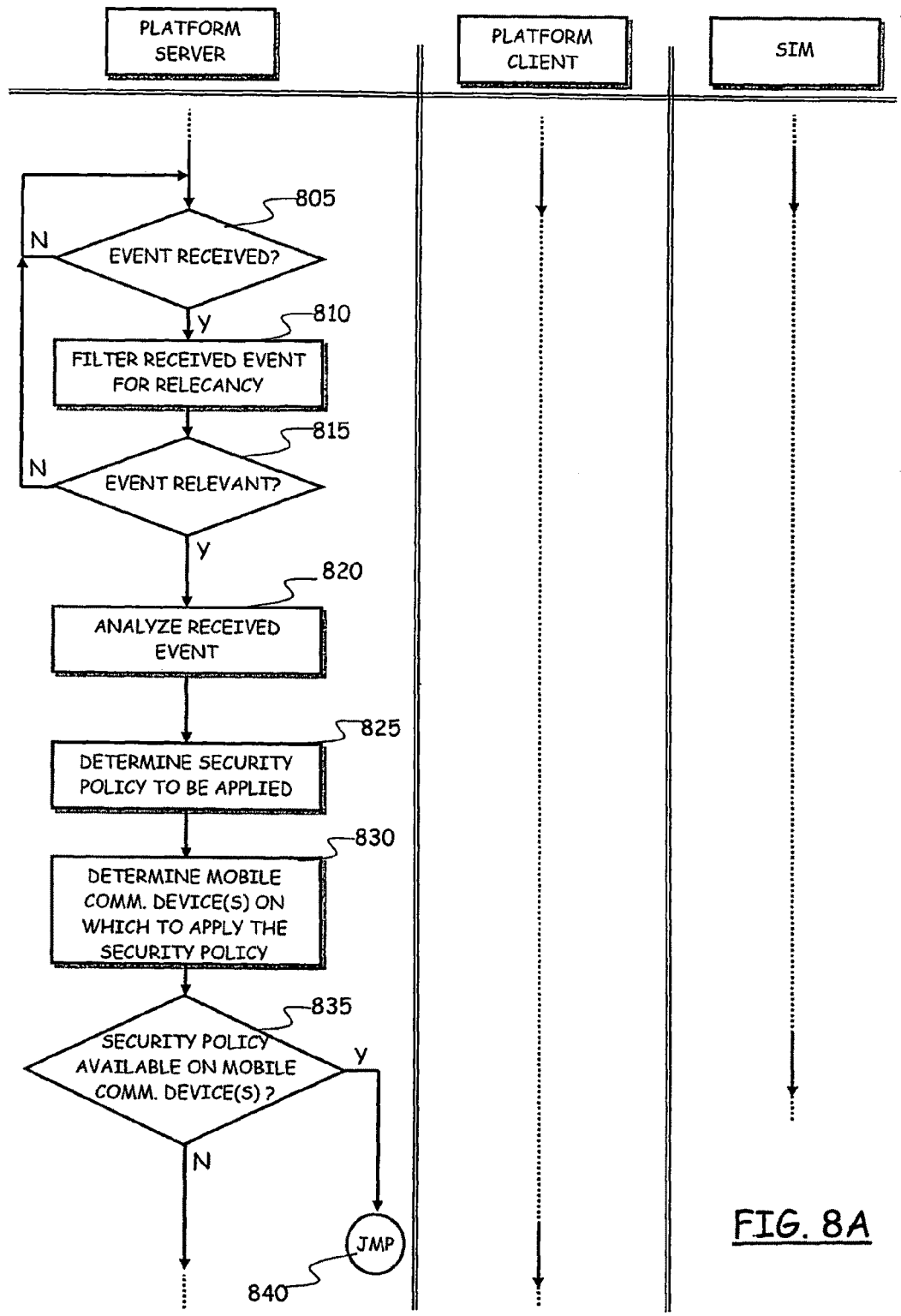
FIGS. 8A and 8B are schematic, simplified flowcharts describing the operation of the platform, depicting the main actions of the involved entities.
Figure 8B:
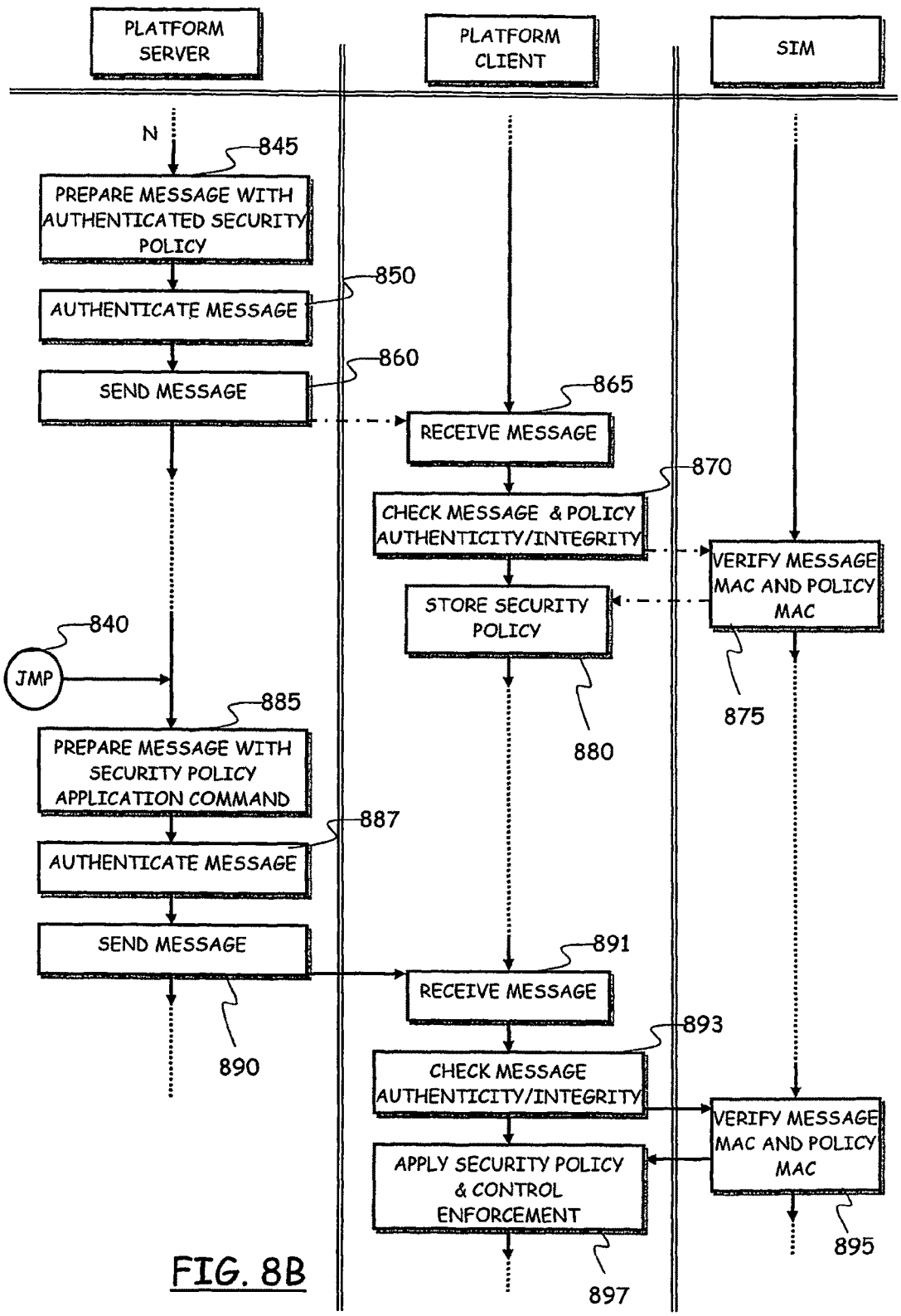

In the following, the operation of the security policy enforcement platform described in the foregoing will be explained with the aid of FIG. 8, wherein a flow is schematically depicted of the actions performed by the platform server and the platform client.

The platform server 140 (particularly, the event collector module 315) listens for events coming from the different possible sources that may be relevant to the security policy enforcement (decision block 805).

When an event is communicated to the event collector module 315 (exit branch Y of decision block 805), the event collector module 315 filters it to ascertain the relevancy for the security policy enforcement (block 810). If the event is not relevant (decision block 815, exit branch N), the event is neglected.

If the event is relevant (decision block 815, exit branch Y), the event manager module 325 analyzes the event (block 820), and determines the suitable security policy to be applied (block 825) and the mobile communications device(s) on which to apply the security policy (block 830).

The event manager module 325 then ascertains whether the selected security policy is already present on the selected mobile communications device(s) (decision block 835), making a query on the security policy database 143.

If it is ascertained that the security policy is not present on the mobile communications device(s) (exit branch N of decision block 835), the event manager module 325 prepares a message to be dispatched to the mobile communications device(s) including the selected security policy (block 840); as described in the foregoing, the security policy is protected by the MAC.

The message is then in turn authenticated (block 845), using the authentication function 327, and the authenticated message is then sent to the mobile communications device(s) (block 850). For sending the message, the policy connection module 330 selects the most suitable communications channel, and, depending on the selected communications channel and the message length, the message may be practically be fragmented into two or more fragments, transmitted separately.

When the mobile communications device receives the message (block 865), the platform client 135 (particularly, the policy management module 405) checks the authenticity and integrity of the received message and of the security policy transported (block 870). To this purpose, the authentication function 435 resident on the SIM 120 is invoked, and it is asked to verify the correctness of the message MAC (and of the policy MAC) (block 875). If the authenticity and integrity are confirmed, the security policy is stored in the local database 420 (block 880).

After having sent to the mobile communications device(s) the selected security policy, or in case the platform server ascertains that the selected security policy is already present on the selected mobile communications device(s) (exit branch Y of decision block 835, and connector 840), the event manager module 325 of the platform server 140 prepares a message with the instruction to apply the specified security policy (block 885). The message is authenticated (block 887) exploiting the authentication function 327, and the message is then sent to the mobile communications device(s) (block 889).

When the mobile communications device receives the message (block 891), the policy management module 405 checks the authenticity and integrity of the received message (block 893). To this purpose, the authentication function 435 resident on the SIM 120 is invoked, and it is asked to verify the correctness of the message MAC (and of the policy MAC) (block 895). If the authenticity of the message from the server is confirmed, the policy management module 405 locates the security policy specified in the message within the local database 420. Once the security policy to be applied is identified in the local database 420, the policy management module 405 invokes the authentication function 435 for assessing the integrity of the stored security policy, exploiting again the policy MAC stored together with the security policy, and integrity are confirmed, the security policy is applied, and its enforcement is controlled (by the policy enforcement module 425) (block 887).

In the platform according to the invention embodiment described in the foregoing, the use of the SIM operatively associated with the mobile communications device for the functions of checking the authenticity and integrity of the security policies is a great advantage; in fact, the SIM implements native security mechanisms, like protected storage areas, anti-tampering shields and sensors, etc., cryptographic functions, which make specialized attacks against the SIM generally relatively expensive, due to the equipments and the skills required to perpetrate them.

Furthermore, by exploiting a SIM-based authentication mechanism, the encryption keys on the SIM may be managed and updated in a secure manner by the mobile communications network operator, remotely, for example exploiting SAT platforms and OTA update mechanisms. The encryption key management (revocation, update, etc.) can for example be performed thanks to the SAT platform 345 at the platform server 140 by means of OTA mechanisms.

The authenticity and integrity of the security policies stored locally at the mobile communications device is guaranteed thanks to the fact that the security policies are communicated and stored together with the respective MAC; in this way, every change to the security policies may be detected by verifying the respective MAC, invoking the SIM authentication functionality.

The present invention has been disclosed by describing an exemplary embodiment thereof, however those skilled in the art, in order to satisfy contingent needs, will readily devise modifications to the described embodiment, as well as alternative embodiments, without for this reason departing from the protection scope defined in the appended claims.

For example, in alternative embodiments different means compared to the MAC may be used to protect the security policies and/or the messages transporting them, like for example mechanisms of digital signature.

Also, in alternative embodiments of the invention, the policies and/or the messages may further be encrypted, instead of being transmitted and stored in clear.

The security policy rules may be defined in ways alternative ways than XML.

The invention claimed is:

1. A system for enforcing security policies on mobile communications devices, the mobile communications devices being adapted to be used in a mobile communications network in operative association with a subscriber identity module, the system having a client-server architecture and comprising:
   a server including a computer operated by a mobile communications network operator; and a client resident on a mobile communications device on which security policies are to be enforced,
wherein said server is adapted to:
determine security policies to be applied on said mobile communications device;
send thereto a security policy to be applied; and
send to the client a policy apply message instructing the client to apply a specified security policy already stored in the client,
the server comprising a server authentication function adapted to authenticate the security policy to be sent to the mobile communications device; and
wherein the mobile communication device, when instructed by said client, is adapted to: receive the security policy to be applied from the server;
assess authenticity of the security policy received from the server by exploiting a client authentication function resident on the subscriber identity module; and
apply the received security policy;
the mobile communication device further comprising:
an interface component, which, when the subscriber identity module is executed by the mobile communications device, interacts with the subscriber identity module;
the interface component invoking the client authentication function on the subscriber identity module when the client receives the security policy; and
the client authentication function resident on the subscriber identity module calculating authentication information on the security policy received from the server; and
a manager module, upon receipt from the server of the policy apply message, causes the client to:
invoke the client authentication function for assessing an integrity of the identified security policy by exploiting the authentication information; and
pass the specified security policy to an enforcer module for applying the specified security policy.

2. The system of claim 1, wherein said server authentication function is adapted to calculate authentication information adapted to allow assessing the authenticity of the security policy to be sent to the mobile communications device, and to add the authentication information to the security policy to be sent to the mobile communications device.

3. The system of claim 2, wherein said authentication information is also adapted to allow assessing the integrity of the security policy to be sent to the mobile communications device.

4. The system of claim 2, wherein said authentication information comprises at least one of a message authentication code or a digital signature calculated on a block of data corresponding to the security policy to be sent to the mobile communications device.

5. The system of claim 2, wherein said client authentication function is adapted to:
compare calculated authentication information to the authentication information contained in the received security policy.

6. The system of claim 5, wherein the server authentication function is adapted to encrypt said authentication information using a secret cryptographic key shared with the client authentication function, and the client authentication function is adapted to decrypt the authentication information in the security policy received from the server.

7. The system of claim 6, wherein the client comprises a non-transitory computer readable medium for storing:
the manager module, which when executed by the mobile communications device, causes the client to manage messages received from the server;
a local database of security policies to be applied by the mobile communications device; and
an enforcer module, which when executed by the mobile communications device, causes the client to enforce selected security policies on the mobile communications device.

8. The system of claim 7, wherein the manager module, when executed by the mobile communications device, further causes the interface component to invoke the client authentication function upon receipt from the server of a message containing a security policy to be applied, and to store the received security policy in the local database in case the security policy is assessed to be authentic.

9. The system of claim 8, wherein the received security policy is stored with the respective authentication information.

10. The system of claim 1, wherein the specified security policy is stored in the local database.

11. The system of claim 10, wherein the manager module, upon receipt from the server of the policy apply message, causes the client to identify the specified security policy in the local database.

12. The system of claim 7, wherein the server is further adapted to send to the client an update message instructing the client to update a specified security policy already stored in the local database, said update message comprising update information for updating the specified policy, and authentication information calculated by the server authentication function on the updated security policy.

13. The system of claim 12, wherein the manager module, upon receipt from the server of the update message, causes the client to identify the specified security policy in the local database to update the security policy based on the update information, and to invoke the client authentication function for assessing the authenticity of the updated security policy, based on authentication information contained in the update message.

14. The system according to claim 1, wherein the server authentication function is further adapted to authenticate the messages to be sent to the mobile communications device, and the client authentication function is further adapted to assess authenticity of the messages received from the server.

15. The system of claim 14, wherein said server authentication function is adapted to calculate message authentication information adapted to allow assessing the authenticity of the messages sent to the mobile communications device, and to add the message authentication information to the message, and the client authentication function is adapted to exploit the message authentication information to assess the authenticity of the received message.

16. The system of claim 15, wherein said message authentication information comprises at least one of a message authentication code or a digital signature calculated on a block of data corresponding to the security policy to be sent to the mobile communications device.

17. The system of claim 1, wherein the server and the client are adapted to communicate with one another over at least one communications channel selected from the group of: a messaging service of the mobile communications network, a GPRS connection, a Wi-Fi connection, a Bluetooth connection, a ZigBee connection, an IrDA connection, and a UMTS connection.

18. The system of claim 1, wherein said client authentication function comprises a SIM application toolkit application implemented on the subscriber identity module.

19. The system of claim 1, wherein the server comprises an event collection and management function adapted to collect and manage events from one or both among systems external to the mobile communications device and systems internal to the mobile communications device, and to determine a security policy to be applied on the mobile communications device responsive to collected events.

20. The system of claim 19, wherein the event collection and management function are adapted to interact with one or more platforms selected from the group comprising:
- an early detection platform adapted to early detect malware attacks based on anomaly detection;
- one or more geographic localization platforms adapted to determine the geographic localization of the mobile communications device;
- an anti-fraud system;
- an intrusion detection system;
- presence detection systems adapted to detect presence within specified areas of a user of the mobile communications device; and
- a context awareness platform.

21. The system of claim 1, wherein said security policy comprises at least one security rule to be enforced on the mobile communications device and is formatted in XML.

22. A method of enforcing security policies on mobile communications devices, wherein the mobile communications devices are adapted to be used in a mobile communications network in operative association with a subscriber identity module, comprising:
- determining, by a server of the mobile communications network, a security policy to be applied on a mobile communications device, and sending the security policy to the mobile communications device; and
- receiving, by the mobile communications device, the security policy and enforcing the security policy;
- said sending the security policy comprising authenticating the security policy to be sent to the mobile communications device; and
- receiving the security policy and enforcing the security policy comprising:
  - interacting, by an interface component of the mobile communications device, with a subscriber identity module; and
  - invoking, by the interface component of the mobile communications device, a client authentication function on the subscriber identity module when the mobile communications device receives the security policy to calculate authentication information on the security policy received from the server; and
- the method further comprising:
  - sending, by the server to the mobile communication device, a policy apply message instructing the mobile communication device to apply a specified security policy already stored thereon;
  - invoking, by the mobile communication device, the client authentication function for assessing an integrity of the identified security policy by exploiting the authentication information; and
  - passing, by the mobile communication device, the specified security policy to an enforcer module for applying the specified security policy.

23. A non-transitory computer-readable medium comprising instructions, which when executed by a mobile communications device, cause the mobile communications advice to perform a method comprising:
- receiving from a server of a mobile communications network a security policy to be enforced on the mobile communications device;
- executing an interface component of a manager module to interact with a subscriber identity module associated with the mobile communications network, the subscriber identity module providing an identification of the mobile communications device with the mobile communications network;
- invoking through the interface component of the manager module a client authentication function on the subscriber identity module to calculate authentication information on the security policy, received from the server;
- assessing an authenticity of the security policy through the client authentication function on the subscriber identity module; and
- applying the authenticated security policy; and
the method further comprising:
- receiving a policy apply message instructing the mobile communication device to apply a specified security policy already stored thereon;
- invoking the client authentication function for assessing an integrity of the identified security policy by exploiting the authentication information; and
- passing the specified security policy to an enforcer module for applying the specified security policy.

24. A non-transitory computer-readable medium comprising instructions, which when executed by a subscriber identity module associated with a mobile communication device, cause the subscriber identity module to perform a method comprising:
- interacting with an interface component of the mobile communication device;
- receiving a command from the interface component to invoke a client authentication function on the subscriber identity module;
- receiving a security policy from a manager module of the mobile communications device;
- calculating authentication information on the security policy;
- assessing an authenticity of the security policy in response to the command;
- indicating to the manager module whether the security policy is authentic;
- receiving a policy apply message instructing the mobile communication device to apply a specified security policy already stored thereon;
- invoking the client authentication function for assessing an integrity of the identified security policy by exploiting the authentication information; and
- passing the specified security policy to an enforcer module for applying the specified security policy.

* * * * *